(12) United States Patent
Yasue

(10) Patent No.: US 12,103,196 B2
(45) Date of Patent: Oct. 1, 2024

(54) INSPECTION APPARATUS, PLATE-SHAPED OBJECT MANUFACTURING APPARATUS, INSPECTION METHOD, AND PLATE-SHAPED OBJECT MANUFACTURING METHOD

(71) Applicant: YOSHINO GYPSUM CO., LTD., Tokyo (JP)

(72) Inventor: Kenzo Yasue, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 270 days.

(21) Appl. No.: 17/054,273

(22) PCT Filed: May 7, 2019

(86) PCT No.: PCT/JP2019/018284
§ 371 (c)(1),
(2) Date: Nov. 10, 2020

(87) PCT Pub. No.: WO2019/220955
PCT Pub. Date: Nov. 21, 2019

(65) Prior Publication Data
US 2021/0138686 A1    May 13, 2021

(30) Foreign Application Priority Data
May 14, 2018  (JP) ................. 2018-093297

(51) Int. Cl.
*B28B 17/00*    (2006.01)
*B28B 19/00*    (2006.01)
(Continued)

(52) U.S. Cl.
CPC ........ *B28B 17/0072* (2013.01); *G01B 11/022* (2013.01); *G01B 11/24* (2013.01); *B28B 19/0092* (2013.01)

(58) Field of Classification Search
CPC ............ B28B 17/0072; B28B 19/0092; G01B 11/022; G01B 11/24
See application file for complete search history.

(56) References Cited

U.S. PATENT DOCUMENTS 4,070,939 A * 1/1978 Neumeister .......... B26D 7/0006
83/72
5,569,835 A * 10/1996 Kenney ................ G01B 5/0014
702/170
(Continued)

FOREIGN PATENT DOCUMENTS

CN    103597314    2/2014
CN    105057229    11/2015
(Continued)

OTHER PUBLICATIONS

Office Action mailed on Jul. 12, 2022 with respect to the corresponding Japanese patent application No. 2020-519574.
(Continued)

*Primary Examiner* — Edmond C Lau
*Assistant Examiner* — Jarreas Underwood
(74) *Attorney, Agent, or Firm* — IPUSA, PLLC

(57) ABSTRACT

There is provided an inspection apparatus for inspecting a plate-shaped inspection target being conveyed. The inspection apparatus includes a light source configured to emit a linear light beam extending along the thickness direction of the inspection target to irradiate a side surface at a lateral end of the inspection target in a width direction orthogonal to a conveying direction of the inspection target, an imager configured to capture the light beam emitted from the light source and irradiating the side surface at the lateral end of the inspection target, an imager driving device configured to move the imager, and an imager controller configured to control the position of the imager. The imager controller is (Continued)

configured to control the position of the imager according to the position of the lateral end of the inspection target.

15 Claims, 8 Drawing Sheets

(51) Int. Cl.
    *G01B 11/02*     (2006.01)
    *G01B 11/24*     (2006.01)

(56) References Cited

U.S. PATENT DOCUMENTS

| | | | | |
|---|---|---|---|---|
| 5,920,735 | A * | 7/1999 | Gelphman | G03B 37/02 |
| | | | | 396/428 |
| 6,556,783 | B1 * | 4/2003 | Gelphman | H04N 23/60 |
| | | | | 356/610 |
| 6,642,063 | B2 * | 11/2003 | Mundt | G01N 21/9501 |
| | | | | 257/E21.53 |
| 9,651,500 | B2 * | 5/2017 | Yamazaki | G01N 21/8901 |
| 2005/0023491 | A1 * | 2/2005 | Young | G01N 21/9503 |
| | | | | 348/125 |
| 2006/0017931 | A1 * | 1/2006 | Kimura | G01N 21/553 |
| | | | | 356/445 |
| 2006/0278817 | A1 * | 12/2006 | Pirkl | G01V 8/20 |
| | | | | 250/221 |
| 2009/0147248 | A1 | 6/2009 | Kohayase et al. | |
| 2012/0204785 | A1 * | 8/2012 | Sato | B65H 23/0322 |
| | | | | 118/46 |
| 2013/0057678 | A1 * | 3/2013 | Prior Carrillo | G01N 21/8806 |
| | | | | 348/125 |
| 2015/0282776 | A1 * | 10/2015 | Shin | A61B 6/5241 |
| | | | | 378/62 |
| 2017/0022104 | A1 * | 1/2017 | Eversole | G01B 11/24 |
| 2021/0047066 | A1 * | 2/2021 | Taguchi | G01N 21/359 |

FOREIGN PATENT DOCUMENTS

| | | | | |
|---|---|---|---|---|
| EP | 1132710 | | 9/2001 | |
| EP | 1132710 A1 * | | 9/2001 | ......... B28B 17/0081 |
| JP | H05-346319 | | 12/1993 | |
| JP | H07-270125 | | 10/1995 | |
| JP | H10-221012 | | 8/1998 | |
| JP | 2000-074646 | | 3/2000 | |
| JP | 2000-292123 | | 10/2000 | |
| JP | 2004-085371 | | 3/2004 | |
| JP | 2004-257859 | | 9/2004 | |
| JP | 2005-249542 | | 9/2005 | |
| JP | 2008298696 A * | | 12/2008 | |
| JP | 2013-134198 | | 7/2013 | |
| JP | 2013134198 A * | | 7/2013 | |
| JP | 2018-059878 | | 4/2018 | |
| JP | 2018059878 A * | | 4/2018 | |
| KR | 10-2003-0085291 | | 11/2003 | |
| WO | WO-2017015247 * | | 1/2017 | |
| WO | WO-2017015247 A1 * | | 1/2017 | ......... B28B 17/0081 |

OTHER PUBLICATIONS

Extended European Search Report issued on Jun. 4, 2021 with respect to the corresponding European Patent Application No. 19803832.5.
International Search Report for PCT/JP2019/018284 mailed on Jun. 18, 2019.
Office Action mailed on Oct. 26, 2023 with respect to the corresponding Taiwanese patent application No. 108116172.
Office Action mailed on Apr. 25, 2024 with respect to the corresponding Chinese patent application No. 201980030022.3.
Office Action mailed on Jan. 23, 2024 with respect to the corresponding Chinese patent application No. 201980030022.3.

* cited by examiner

INSPECTION APPARATUS, PLATE-SHAPED OBJECT MANUFACTURING APPARATUS, INSPECTION METHOD, AND PLATE-SHAPED OBJECT MANUFACTURING METHOD

TECHNICAL FIELD

The present invention relates to an inspection apparatus, a plate-shaped object manufacturing apparatus, an inspection method, and a plate-shaped object manufacturing method.

BACKGROUND ART

A plate-shaped product, which includes an inorganic material such as a ceramic or a metal and an organic, high-polymer material such as a resin as raw materials, is continuously manufactured by, for example, molding the raw materials into a continuous plate shape (strip shape) and then performing various operations such as cutting and drying as necessary on the molded object while conveying the molded object.

Then, the plate-shaped intermediate product or product being conveyed is inspected to determine whether the shape and size of a predetermined part of the plate-shaped intermediate product or product meet a standard.

Accordingly, various inspection apparatuses for inspecting plate-shaped objects being manufactured have been studied.

For example, Patent Document 1 discloses a plate-shaped continuous object surface inspection apparatus. The plate-shaped continuous object surface inspection apparatus includes a projector that irradiates an end face of a plate-shaped continuous object continuously moving in one direction with a linear light beam; and a light receiver including a lens system that causes a bright line generated on the end face of the plate-shaped continuous object to form an image on a light receiving surface, an optical sensor array including multiple light receiving elements that are arranged in the width direction of the bright line image on the light receiving surface and convert the bright line image into electric signals, and a calculator that calculates and outputs an inclination of the bright line image on the light receiving surface based on the output signals of the optical sensor array.

The plate-shaped continuous object surface inspection apparatus disclosed in Patent Document 1 can inspect the angle of an end face of a plate-shaped continuous object with respect to the front surface of the plate-shaped continuous object.

RELATED-ART DOCUMENT

Patent Document

[Patent Document 1] Japanese Unexamined Patent Application Publication No. H05-346319

DISCLOSURE OF INVENTION

Problems to be Solved by the Invention

When a plate-shaped object is conveyed with a conveying unit such as a belt conveyor to continuously manufacture the plate-shaped object in, for example, a factory, the position of an end of the plate-shaped object in a width direction, which is orthogonal to the conveying direction of the conveying unit, may change in a direction orthogonal to the conveying direction due to the meandering of the plate-shaped object or the belt conveyor.

Also, the width of a plate-shaped object being manufactured may vary within a standard range or, in some cases, beyond the standard range. Therefore, when a plate-shaped object is conveyed by a conveying unit during a manufacturing process of the plate-shaped object, the position of an end of the plate-shaped object on the conveying unit in a width direction orthogonal to the conveying direction may change in a direction orthogonal to the conveying direction.

However, in the plate-shaped continuous object surface inspection apparatus disclosed in Patent Document 1, it is not assumed that the position of an end of a plate-shaped object on a conveying unit in a width direction orthogonal to the conveying direction changes in a direction orthogonal to the conveying direction. Therefore, when the position of an end of a plate-shaped object, which is an inspection target on the conveying unit, in a width direction orthogonal to the conveying direction changes in a direction orthogonal to the conveying direction, it is difficult to accurately inspect the inspection target.

In view of the above-described problem in the related-art technology, an aspect of the present invention provides an inspection apparatus that can accurately inspect a plate-shaped inspection target on a conveying unit even when the position of an end of the inspection target in a width direction orthogonal to a conveying direction changes in a direction orthogonal to the conveying direction.

Means for Solving the Problems

To solve the above-described problem, an aspect of the present invention provides an inspection apparatus for inspecting a plate-shaped inspection target being conveyed. The inspection apparatus includes a light source configured to emit a linear light beam extending along the thickness direction of the inspection target to irradiate a side surface at a lateral end of the inspection target in a width direction orthogonal to a conveying direction of the inspection target, an imager configured to capture the light beam emitted from the light source and irradiating the side surface at the lateral end of the inspection target, an imager driving device configured to move the imager, and an imager controller configured to control the position of the imager. The imager controller is configured to control the position of the imager according to the position of the lateral end of the inspection target.

Advantageous Effect of the Invention

An aspect of the present invention makes it possible to provide an inspection apparatus that can accurately inspect a plate-shaped inspection target on a conveying unit even when the position of an end of the inspection target in a width direction orthogonal to a conveying direction changes in a direction orthogonal to the conveying direction.

DESCRIPTION OF EMBODIMENTS

Embodiments of the present invention are described below with reference to the accompanying drawings. However, the present invention is not limited to those embodiments, and variations and modifications may be made without departing from the scope of the present invention.

[Inspection Apparatus]

An example of a configuration of an inspection apparatus according to an embodiment is described.

An inspection apparatus of the present embodiment inspects a plate-shaped inspection target being conveyed and includes components described below.

A light source configured to emit a linear light beam extending along the thickness direction of the inspection target to irradiate a side surface at a lateral end of the inspection target in a width direction orthogonal to a conveying direction of the inspection target.

An imager configured to capture the light beam emitted from the light source and irradiating the side surface at the lateral end of the inspection target.

An imager driving device configured to move the imager.

An imager controller configured to control the position of the imager.

The imager controller can control the position of the imager according to the position of the lateral end of the inspection target.

In the related-art inspection apparatus for inspecting a plate-shaped inspection target being conveyed by a conveying unit, it is not assumed that the position of a lateral end of the plate-shaped inspection target in a width direction orthogonal to the conveying direction changes in a direction orthogonal to the conveying direction. Accordingly, if the position of the lateral end of the inspection target on the conveying unit in the width direction orthogonal to the conveying direction changes, the inspection accuracy decreases or the inspection itself cannot be performed.

For the above reason, the inventor of the present invention earnestly conducted a study on an inspection apparatus that can accurately inspect a plate-shaped object even if the position of a lateral end of the plate-shaped inspection target on a conveying unit in a width direction orthogonal to the conveying direction changes in a direction orthogonal to the conveying direction, and completed the present invention.

Examples of configurations of an inspection apparatus of the present embodiment are illustrated in FIGS. 1 through 4.

The same reference number may be assigned to the same component, and the repeated descriptions of the same component may be omitted.

Figure 1:
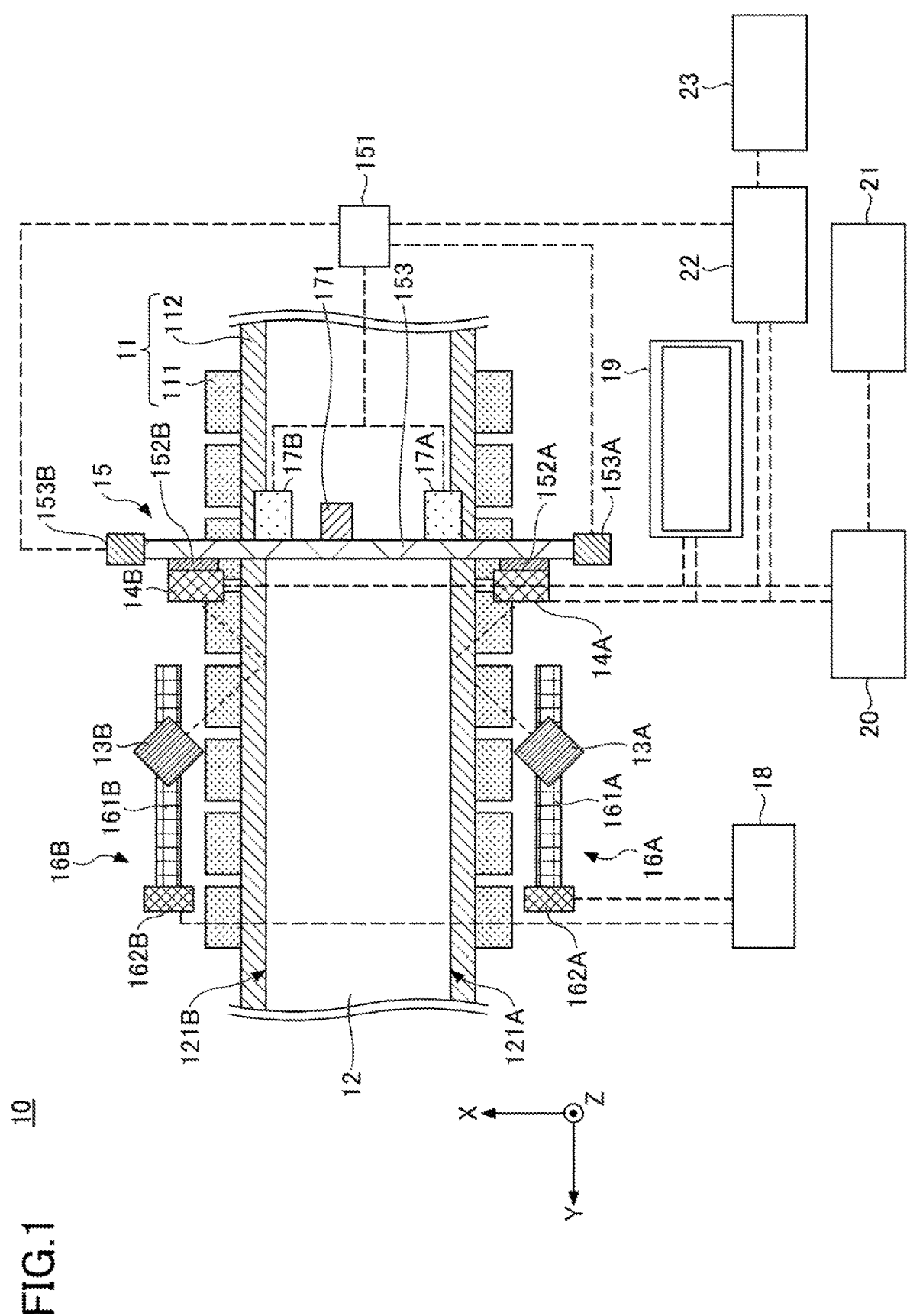
FIG. 1 is a top view of an inspection apparatus according to an embodiment of the present invention.
Figure 2:
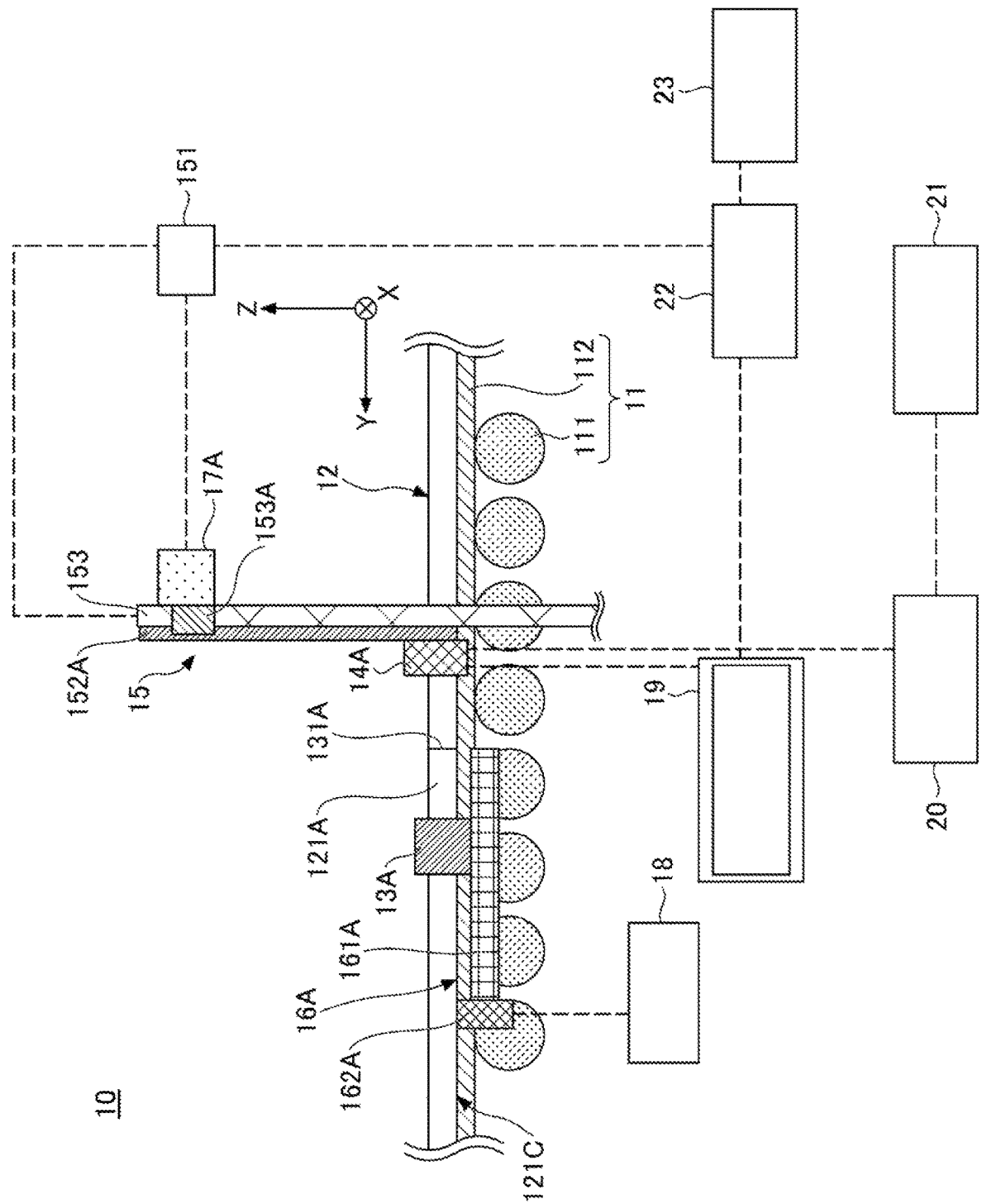
FIG. 2 is a side view of the inspection apparatus illustrated in FIG. 1.

FIG. 1 is a top view of an inspection apparatus of the present embodiment, and FIG. 2 is a left side view of the inspection apparatus illustrated in FIG. 1. That is, FIG. 2 illustrates an inspection apparatus 10 seen along an X-axis from a lower end side in FIG. 1.

Figure 3:
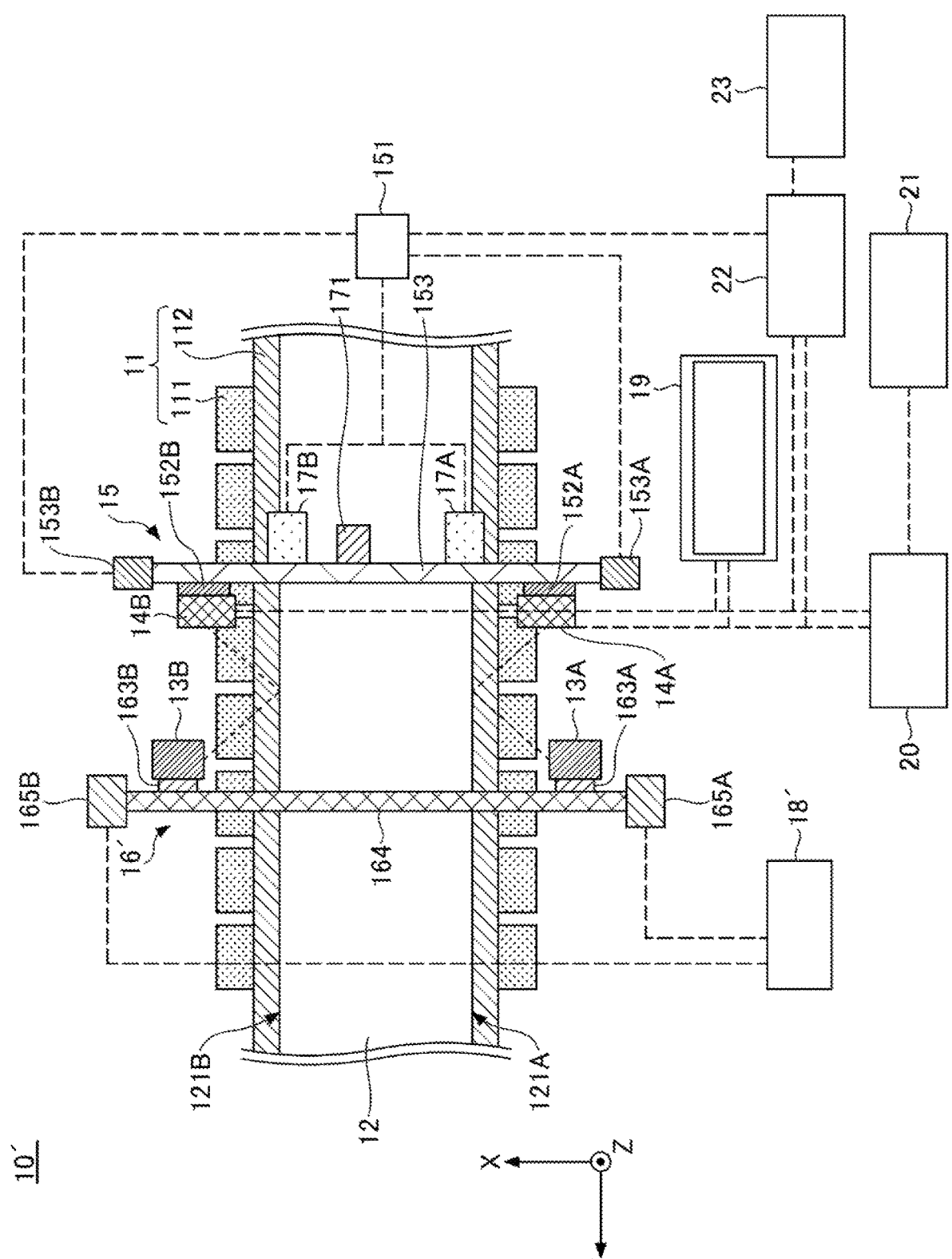
FIG. 3 is a top view of an inspection apparatus with another configuration according to an embodiment of the present invention.
Figure 4:
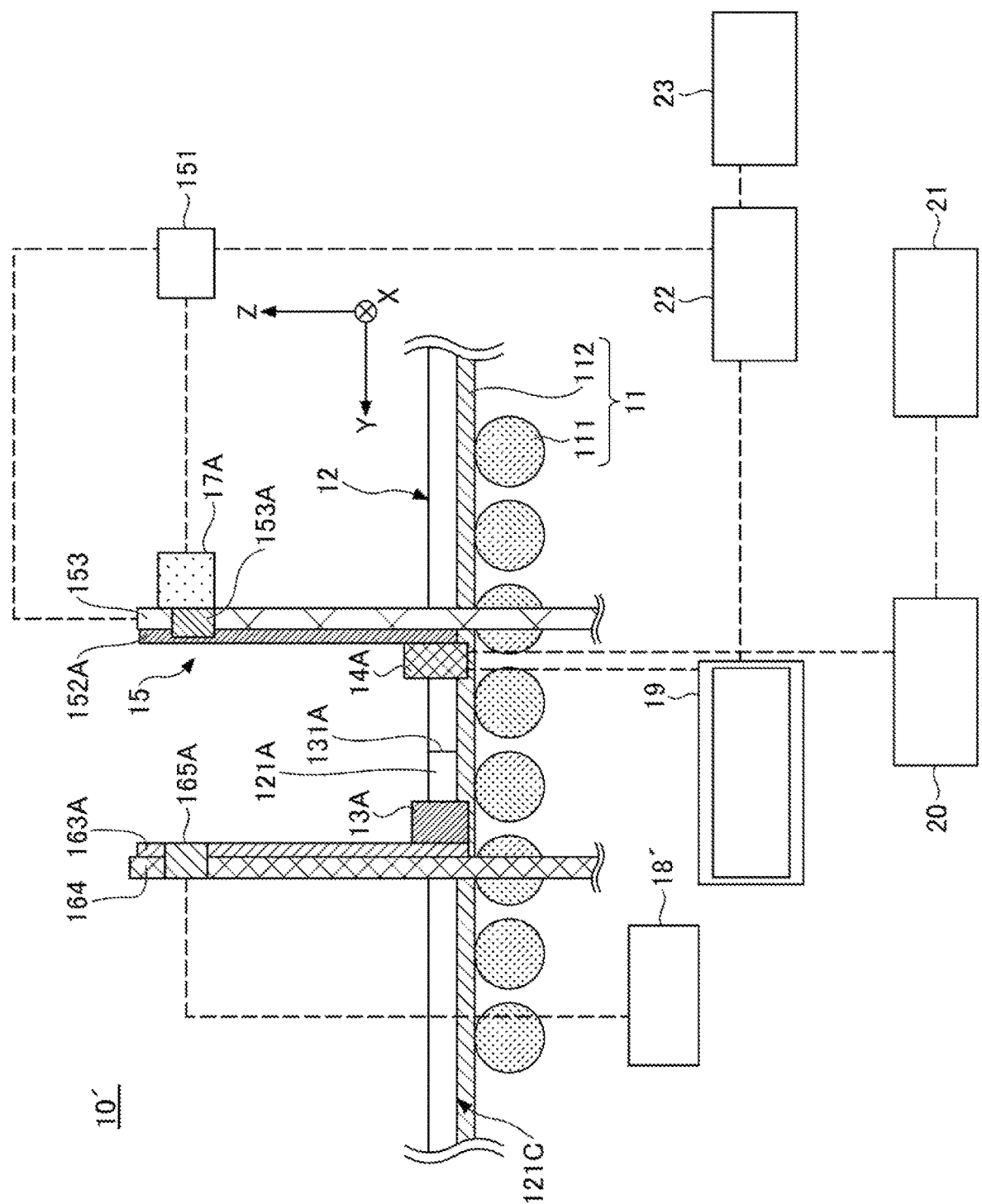
FIG. 4 is a side view of the inspection apparatus illustrated in FIG. 3.

Also, FIG. 3 is a top view of an inspection apparatus with another configuration according to the present embodiment, and FIG. 4 is a left side view of the inspection apparatus illustrated in FIG. 3. That is, FIG. 4 illustrates an inspection apparatus 10' seen along the X-axis from a lower end side in FIG. 3.

The inspection apparatus 10' illustrated in FIG. 3 and FIG. 4 has the same configuration as the inspection apparatus 10 illustrated in FIG. 1 and FIG. 2 except for a light source driving device 16' and a light source controller 18'. Therefore, unless otherwise mentioned, the inspection apparatus of the present embodiment is described below using FIG. 1 and FIG. 2.

In FIGS. 1 through 4, an X-axis direction corresponds to the width direction of an inspection target 12, a Y-axis direction corresponds to the conveying direction of the inspection target 12, and a Z-axis direction corresponds to the thickness direction of the inspection target 12.

Each of the inspection apparatuses 10 and 10' of the present embodiment illustrated in FIGS. 1 through 4 inspects a plate-shaped inspection target 12 being conveyed by a conveying unit 11. Components of the inspection apparatuses of the present embodiment are described below.

(Conveying Unit)

A conveying unit 11 that conveys and supplies the inspection target 12 to the inspection apparatus 10 is not limited to any particular mechanism. In the example of FIG. 1 and FIG. 2, the conveying unit 11 is a belt conveyor including a belt 112 wound around multiple rollers 111. However, the conveying unit 11 for conveying and supplying the inspection target 12 may be implemented by any other type of mechanism such as a roller conveyor.

The inspection apparatus 10 may be incorporated in a plate-shaped object manufacturing apparatus, and the conveying unit 11 is not included in the configuration of the inspection apparatus 10. However, the inspection apparatus may include a part of the conveying unit 11 disposed in an area where light sources 13A and 13B and imagers 14A and 14B are provided to more accurately adjust the position of the inspection target 12 being conveyed relative to the light sources 13A and 13B and the imagers 14A and 14B.

(Inspection Target)

The configuration of the plate-shaped inspection target 12 inspected by the inspection apparatus 10 of the present embodiment is not limited to any specific configuration as long as the inspection target 12 is a plate-shaped object. Here, a plate-shaped object indicates not only an object cut into a predetermined length, but also a continuous plate-shaped object, i.e., a band-shaped object.

(Light Sources)

The inspection apparatus 10 of the present embodiment includes light sources 13A and 13B that emit linear light beams extending along the Thickness direction of the inspection target 12 to irradiate side surfaces at lateral ends 121A and 121B of the inspection target 12 in the width direction orthogonal to the conveying direction.

In FIG. 1 and FIG. 2, the conveying direction of the inspection target 12 is the Y-axis direction. Therefore, in FIG. 1 and FIG. 2, the width direction orthogonal to the conveying direction of the inspection target 12 corresponds to the X-axis direction that is orthogonal to the Y-axis direction, which is the conveying direction. Hereafter, the width direction orthogonal to the conveying direction of the inspection target 12 is also simply referred to as "the width direction of the inspection target 12".

For example, as illustrated in FIG. 2, the light source 13A can irradiate the side surface at the lateral end 121A of the inspection target 12 with a linear light beam 131A extending along the thickness direction of the inspection target 12. FIG. 2 illustrates only an example of the configuration on the left side. However, also on the right side, the light source 13B can irradiate the side surface at a lateral end of the inspection target 12 with a linear light beam extending along the thickness direction of the inspection target 12.

Any device capable of emitting the above-described linear light beam may be used as the light source. For example, a line laser may be preferably used to emit a light beam with sufficient brightness.

(Imager)

The inspection apparatus 10 of the present embodiment may further include imagers 14A and 14B for capturing light beams emitted from the light sources 13A and 13B to irradiate the side surfaces at the lateral ends of the inspection target 12 in the width direction. Each of the imagers 14A and 14B may be implemented by any device that can capture a light beam emitted from the light source 13A or 13B. For example, each of the imagers 14A and 14B may be implemented by a camera module including a semiconductor image sensor such as a complementary metal oxide semiconductor (CMOS) sensor or a charge coupled device (CCD) sensor.

The linear light beam, which is emitted from the light source toward the side surface at a lateral end of the inspection target in the width direction and extends along the thickness direction of the inspection target, forms a shape corresponding to the shape of the side surface at the lateral end of the inspection target in the width direction. Therefore, by capturing the light beam with an imager and monitoring the shape of the light beam, it is possible to check a change in the shape of the side surface of the inspection target and determine whether the shape of the lateral end of the inspection target is acceptable. Also, for example, it is possible to calculate parameters of the shape of the lateral end of the inspection target based on the shape of the captured light beam and determine whether the shape of the lateral end of the inspection target is acceptable.

The positions of the light sources 13A and 13B and the imagers 14A and 14B are not limited to specific positions, and may be determined such that the side surfaces at the lateral ends 121A and 121B of the inspection target 12 can be irradiated and images of the side surfaces can be captured. Particularly, to prevent the light beams from being blocked by, for example, the conveying unit 11, light emitters of the light sources 13A and 13B and light receivers of the imagers 14A and 14B are preferably placed in positions higher than a lower surface 121C (see FIG. 2) of the inspection target 12.

The lower surface 121C of the inspection target 12 indicates a surface that is in contact with the conveying unit 11. For example, when a belt conveyor is used as the conveying unit 11 as in the inspection apparatus 10 illustrated in FIG. 1 and FIG. 2, the lower surface 121C of the inspection target 12 indicates a surface of the inspection target 12 that is in contact with the belt 112 of the belt conveyor.

(Imager Driving Device, Imager Controller)

As described above, when the plate-shaped inspection target 12 is continuously conveyed, the positions, i.e., the coordinate positions on the X axis, of the lateral ends 121A and 121B of the plate-shaped inspection target 12 being conveyed on the conveying unit 11 may change in the X-axis directions.

For this reason, the inspection apparatus 10 of the present embodiment may include a imager driving device 15 for moving the imagers 14A and 14B and an imager controller 151 for controlling the positions of the imagers 14A and 14B.

The imager controller 151 can control the positions of the imagers 14A and 14B according to the positions of the lateral ends 121A and 121B of the inspection target 12. The imager controller 151 is preferably configured to control the X-axis coordinate positions of the imagers 14A and 14B according to the X-axis coordinate positions of the lateral ends 121A and 121B of the inspection target 12.

Although the configuration of the imager driving device 15 is not limited to any specific configuration, the imager driving device 15 may include, for example, arm parts 152A and 152B for fixing and supporting the imagers 14A and 14B. The imager driving device 15 may further include, for example, a base part 153 that is disposed along the width direction of the inspection target 12 and includes an imager linear motion mechanism. The arm parts 152A and 152B are fixed to the imager linear motion mechanism of the base part 153 and are driven by imager driving units 153A and 153B connected to the imager linear motion mechanism so that the arm parts 152A and 152B can freely move in the width direction of the inspection target 12, i.e., along the X axis in the figures.

Accordingly, the imagers 14A and 14B fixed to the arm parts 152A and 152B can also be freely moved in the width direction of the inspection target 12, i.e., along the X axis in the figures.

Examples of the imager linear motion mechanism include a linear rail (linear guide) and a linear shaft. Also, each of the imager driving units 153A and 153B may be implemented by, for example, a linear bush, a linear motor, or a motor. When a motor is used for each of the imager driving units 153A and 153B, a timing belt or a pulley may be used together with the motor as necessary to convert a rotational motion into a linear motion.

The imager driving device 15 is not limited to the above-described configuration as long as the imagers 14A and 14B can be moved along the width direction of the inspection target 12.

The imager controller 151 can control the positions of the imagers 14A and 14B according to, for example, the positions of the linear light beams emitted from the light sources 13A and 13B to irradiate the side surfaces at the lateral ends 121A and 121B of the inspection target 12 and captured by the imagers 14A and 14B. When the distances between the side surfaces at the lateral ends 121A and 121B of the inspection target 12 and the imagers 14A and 14B are constant, the captured linear light beams irradiating the side surfaces at the lateral ends 121A and 121B of the inspection target 12 are in constant positions in images captured by the imagers 14A and 14B.

However, when the distances between the lateral ends 121A and 121B of the inspection target 12 and the imagers 14A and 14B change, the positions of the captured linear light beams irradiating the side surfaces at the lateral ends 121A and 121B of the inspection target 12 change laterally in the images captured by the imagers 14A and 14B.

Therefore, for example, the imager controller 151 can control the positions of the imagers 14A and 14B so that the captured linear light beams irradiating the side surfaces at the lateral ends of the inspection target 12 are placed in predetermined positions, e.g., in the center positions, in images captured by the imagers 14A and 14B. Thus, the imager controller 151 can control the positions of the imagers 14A and 14B according to the positions of the lateral ends 121A and 121B of the inspection target 12.

The inspection apparatus 10 of the present embodiment may also include any component other than the above-described components.

(Upper Imagers)

The inspection apparatus 10 of the present embodiment may also include, for example, upper imagers 17A and 17B that are disposed above the inspection target 12 being conveyed and configured to detect the positions of the lateral ends 121A and 121B of the inspection target 12.

Each of the upper imagers 17A and 17B may be implemented by, but is not limited to, a camera module including a semiconductor image sensor such as a CMOS sensor or a CCD sensor.

The upper imagers 17A and 17B may be placed in any appropriate positions. For example, the upper imagers 17A and 17B are preferably positioned to be able to capture images of desired areas in the width direction of the inspection target 12 being conveyed. Therefore, as illustrated in FIG. 1 and FIG. 2, the upper imagers 17A and 17B may be fixed to a component such as the base part 153 of the imager driving device 15 that is disposed along the width direction of the inspection target 12.

Providing the upper imagers 17A and 17B to capture the images of areas including the lateral ends 121A and 121B of the inspection target 12 being conveyed makes it possible to inspect the captured images visually or by image processing and thereby easily detect the positions of the lateral ends 121A and 121B. For example, the position and the imaging range of the upper imager 17A may be determined so that the lateral end 121A of the inspection target 12 being conveyed can be detected. Also, the position and the imaging range of the upper imager 17B may be determined so that the lateral end 121B of the inspection target 12 being conveyed can be detected.

For example, the upper imagers 17A and 17B may be used to control the positions of the imagers 14A and 14B at the start of inspection or, in some cases, during inspection.

An upper imager light source 171 may also be provided to irradiate the inspection target with a linear light beam extending along the width direction of the inspection target, and the linear light beam may be captured by the upper imagers 17A and 17B.

At the lateral ends 121A and 121B of the inspection target 12, steps are formed between the inspection target 12 and the upper surface of the conveying unit 11. Accordingly, bending points are formed in the linear light beam extending along the width direction of the inspection target 12 at positions corresponding to the steps. Therefore, as described above, the end positions can be calculated by providing the upper imager light source 171, capturing the linear light beam emitted from the upper imager light source 171 and extending along the width direction of the inspection target 12 with the upper imagers 17A and 17B, and calculating the coordinates of the bending points.

Also, for example, at the start of inspection, the imagers 14A and 14B can be moved to suitable positions by controlling the positions of the imagers 14A and 14B based on the positions, specifically, the X axis coordinate positions, of the lateral ends 121A and 121B of the inspection target 12 detected by the upper imagers 17A and 17B.

Therefore, the upper imagers 17A and 17B may be connected to, for example, the imager controller 151 described above so that control information can be supplied to the upper imagers 17A and 17B.

In the example described above, two upper imagers 17A and 17B are provided. However, the present invention is not limited to this example. For example, one upper imager may be provided and configured to be able to capture an image of the entire inspection target 12 in the width direction.

(Light Source Driving Devices, Light Source Controller)

The inspection apparatus 10 of the present embodiment may further include light source driving devices 16A and 16B for moving the light sources 13A and 13B. Also, the inspection apparatus 10 of the present embodiment may further include a light source controller 18 that controls the positions of the light sources 13A and 13B such that the incident angles of light beams irradiating the side surfaces at the lateral ends 121A and 121B of the inspection target 12 become predetermined angles.

According to the study conducted by the inventor of the present invention, depending on the incident angle of a linear light beam emitted from a light source to irradiate a side surface at the lateral end of the inspection target, the shape of the linear light beam irradiating the side surface at the lateral end of an inspection target may become different from the shape in the thickness direction of the side surface at the lateral end of the inspection target, and a correction may become necessary. Such a correction is performed based on the incident angle of the light beam emitted from the light source and entering the side surface at the lateral end of the inspection target.

Therefore, it is preferable to adjust the position of the light source so that the incident angle of the linear light beam emitted from the light source and entering the side surface at the lateral end of the inspection target becomes a desired value. For this purpose, as illustrated in FIG. 1 and FIG. 2, the inspection apparatus 10 of the present embodiment may include the light source driving devices 16A and 16B and the light source controller 18.

Although the configuration of the light source driving devices 16A and 16B is not limited to any specific configuration, the light source driving devices 16A and 16B may be implemented by, for example, combining light source linear motion mechanisms 161A and 161B and light source driving units 162A and 162B. The light source driving devices 16A and 16B are preferably configured to move at least the light sources 13A and 13B along the conveying direction of the inspection target 12, i.e., along the Y axis in FIGS. 1 and 2. Configuring the light sources 13A and 13B to be movable along the conveying direction of the inspection target 12 makes it possible to easily adjust the incident angles of light beams emitted from the light sources 13A and 13B and entering the side surfaces at the lateral ends 121A and 121B of the inspection target 12.

Each of the light source linear motion mechanisms 161A and 161B may be implemented by, for example, a linear rail (linear guide) or a linear shaft. Also, each of the light source driving units 162A and 162B may be implemented by, for example, a linear bush, a linear motor, or a motor. When a motor is used as the light source driving unit, a timing belt or a pulley may be used together with the motor as necessary to convert a rotational motion into a linear motion.

Although not limited to any specific value, the incident angle of the light beam emitted from the light source and entering the side surface at a lateral end of the inspection target is preferably greater than or equal to 30 degrees and less than or equal to 60 degrees and is more preferably greater Than or equal to 40 degrees and less than or equal to 50 degrees. The incident angle is particularly preferably 45 degrees. When the incident angle is 45 degrees, the shape of the light beam irradiating the side surface at a lateral end of the inspection target becomes the same as the shape of the side surface at the lateral end of the inspection target, and needs not to be corrected. The light source driving devices 16A and 16B can control the positions of the light sources 13A and 13B such that the incident angles of the linear light beams emitted from the light sources 13A and 13B and entering the side surfaces at the lateral ends 121A and 121B of the inspection target 12 become values within the above-described preferable ranges.

The configuration of the light source driving device is not limited to the above-described example. For example, the light source driving device may have a configuration similar to the configuration of the imager driving device described above.

A specific example of a configuration is described with reference to FIG. 3 and FIG. 4. Components illustrated in FIG. 3 and FIG. 4 are the same as those illustrated in FIG. 1 and FIG. 2 except for a light source driving device 16' and a light source controller 18'. Accordingly, the same reference numbers are assigned to the same components, and descriptions of those components are omitted here.

The light source driving device 16' may include, for example, arm parts 163A and 163B on which the light sources 13A and 13B are fixed and supported as illustrated in FIGS. 3 and 4. In this case, the light source driving device 16' may also include a base part 164 that is disposed to extend along the width direction of the inspection target 12 and includes a light source linear motion mechanism. The arm parts 163A and 163B are fixed to the light source linear motion mechanism of the base part 164 and driven by light source driving units 165A and 165B connected to the light source linear motion mechanism so that the arm parts 163A and 163B can be moved freely along the width direction of the inspection target 12, i.e., along the X axis in the figures.

With this configuration, the light sources 13A and 13B fixed to the arm parts 163A and 163B can also be freely moved along the width direction of the inspection target 12, i.e., along the X axis in the figures. Configuring the light sources 13A and 13B to be movable along the width direction of the inspection target 12 makes it possible to easily adjust the incident angles of light beams emitted from the light sources 13A and 13B and entering the side surfaces at the lateral ends 121A and 121B of the inspection target 12.

The light source linear motion mechanism may be implemented by, for example, a linear rail (linear guide) or a linear shaft. Also, each of the light source driving units 165A and 165B may be implemented by a linear bush, a linear motor, or a motor. When a motor is used for each of the light source driving units 165A and 165B, a timing belt or a pulley may be used together with the motor as necessary to convert a rotational motion into a linear motion.

The light source controller 18' may be connected to, for example, the light source driving units 165A and 165B and configured to control the positions of the light sources 13A and 13B such that the incident angles of linear light beams emitted from the light sources 13A and 13B and entering the side surfaces at the lateral ends 121A and 121B of the inspection target 12 become desired values. The preferable ranges of the incident angles of the linear light beams emitted from the light sources 13A and 13B and entering the side surfaces at the lateral ends 121A and 121B of the inspection target 12 are already described, and therefore their descriptions are omitted here.

Also, the light source driving device may not be provided separately. For example, support parts extending in the Y-axis direction in FIG. 1 and FIG. 2 may be attached to the arm parts 152A and 152B of the imager driving device 15 for supporting the imagers 14A and 14B, and each combination of the imagers 14A and 14B and the light sources 13A and 13B may be fixed to the same arm part. This configuration makes it possible to maintain constant distances between the imagers 14A and 14B and the light sources 13A and 13B, and also maintain constant distances between the light sources 13A and 13B and the imagers 14A and 14B, and the lateral ends 121A and 121B of the inspection target 12. This configuration eliminates the need to separately provide the light source driving devices 16A and 16B and the light source controller 18 and thereby makes it possible to reduce the costs. However, because each combination of the light sources 13A and 13B and the imagers 14A and 14B are fixed to the same arm part, this configuration may increase the size of the entire apparatus. Accordingly, the configuration is preferably selected taking into account, for example, required costs and the size of the apparatus.

(Display)

The inspection apparatus of the present embodiment may further include a display that displays an image of a light beam emitted from the light source to irradiate the side surface at a lateral end of the inspection target and captured by the imager.

As described above, when the distances between the imagers 14A and 14B and the lateral ends 121A and 121B of the inspection target 12 change, the positions of captured light beams irradiating the side surfaces at the lateral ends 121A and 121B of the inspection target 12 vary laterally in images captured by the imagers 14A and 14B. For this reason, a display 19 is provided to display images of the linear light beams that are emitted from the light sources 13A and 13B to irradiate the side surfaces at the lateral ends 121A and 121B of the inspection target 12 and captured by the imagers 14A and 14B. For example, this makes it possible to monitor the positions of the linear light beams, which irradiate the side surfaces at the lateral ends 121A and 121B of the inspection target 12, in the images captured by the imagers 14A and 14B.

In this case, for example, an operator of the inspection apparatus 10 of the present embodiment may input a command to the imager controller 151 while viewing images on the display 19 to control the positions of the imagers 14A and 14B.

Also, the operator of the inspection apparatus of the present embodiment, while viewing images on the display 19, may instruct the controller of the plate-shaped object manufacturing apparatus to change manufacturing conditions of a plate-shaped object, e.g., manufacturing conditions of the lateral ends of the plate-shaped object, and thereby adjust the shapes (edge shapes) of the lateral ends of the plate-shaped object.

The display 19 may be, for example, but is not limited to, a liquid crystal display (LCD) or a cathode ray tube (CRT) display.

(End Shape Calculation Unit, End Shape Determining Unit)

The inspection apparatus 10 of the present embodiment may also include an end shape calculation unit 20 that calculates the shapes of the lateral ends 121A and 121B of the inspection target 12 based on the shapes of the light beams emitted from the light sources 13A and 13B to irradiate the side surfaces at the lateral ends 121A and 121B of the inspection target 12 and captured by the imagers 14A and 14B. Further, the inspection apparatus 10 of the present embodiment may include an end shape determining unit 21 configured to determine the shapes of the lateral ends 121A and 121B of the inspection target 12 that are calculated by the end shape calculation unit 20.

The lateral end of the inspection target to be inspected by the inspection apparatus of the present embodiment may have any shape and is not limited to a specific shape.

Normally, when manufacturing a product of a plate-shaped object, there is a standard for the end shape of a product or an intermediate product of the plate-shaped object, and the product or the intermediate product needs to satisfy the standard.

Therefore, the inspection apparatus 10 of the present embodiment may include the end shape calculation unit 20 that calculates the shapes of the lateral ends 121A and 121B of the inspection target 12 based on the shapes of the light beams emitted from the light sources to irradiate the side surfaces at the lateral ends 121A and 121B of the inspection target 12 and captured by the imagers 14A and 14B.

The end shape calculation unit 20 can calculate, for example, the shapes of linear light beams irradiating the side surfaces at the lateral ends 121A and 121B of the inspection target 12 and captured by the imagers 14A and 14B. For example, the shape of a linear light beam may be detected by an imager image processor of the end shape calculation unit 20. Then, a parameter calculator of the end shape calculation unit 20 can arrange virtual points along the detected shape of the light beam and calculate the coordinates of the points. The parameter calculator can also calculate the lengths of straight portions included in the detected linear light beam and the angles between the straight portions.

In the end shape calculation unit 20, for example, the imager image processor can correct the shapes of light beams irradiating the side surfaces at the lateral ends of the inspection target 12 based on the incident angles of the light beams emitted from the light sources 13A and 13B and entering the lateral ends 121A and 121B of the inspection target 12.

When the inspection target is a gypsum board, the end shape is specified in JIS A 6910 (2014), and the gypsum board may have various end shapes as illustrated in FIGS. 5A through 5D. An end shape 31 in FIG. 5A has a square edge, an end shape 32 in FIG. 5B has a tapered edge, an end shape 33 in FIG. 5C has a beveled edge, and an end shape 34 in FIG. 5D has a round edge. In FIGS. 5A through 5D, the upper side corresponds to the front surface, and the lower side corresponds to the back surface.

Figure 5A:
FIG. 5A is a drawing illustrating an example of an end shape of a gypsum board.
Figure 5B:
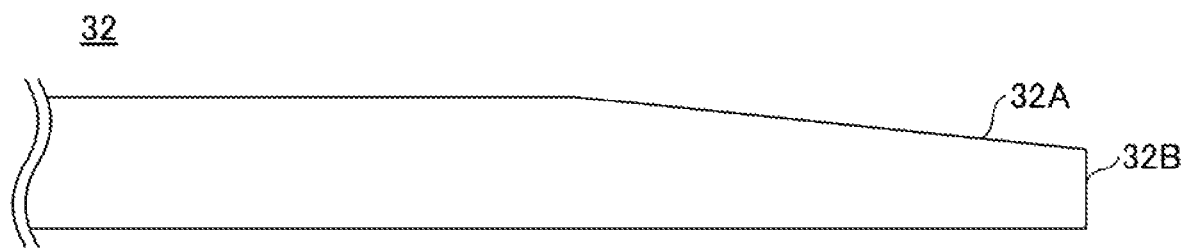
FIG. 5B is a drawing illustrating an example of an end shape of a gypsum board.
Figure 5C:
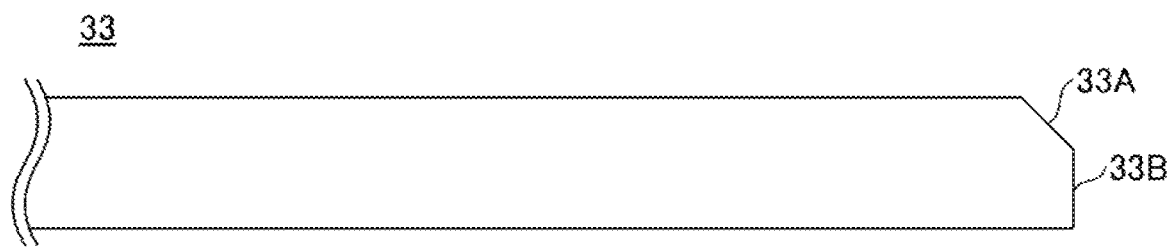
FIG. 5C is a drawing illustrating an example of an end shape of a gypsum board.
Figure 5D:
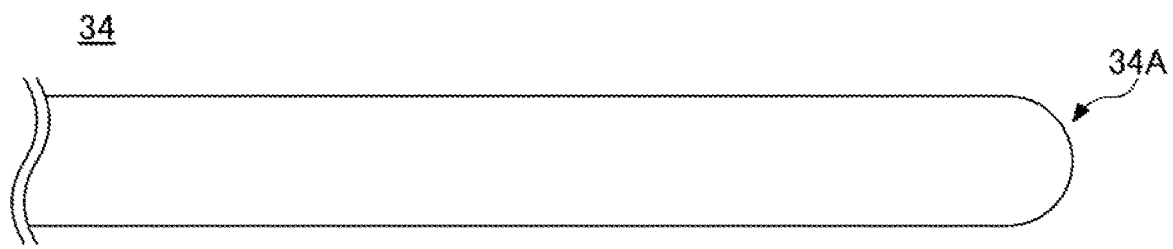
FIG. 5D is a drawing illustrating an example of an end shape of a gypsum board.

For example, when the gypsum board having the end shape 33 with a beveled edge illustrated in FIG. 5C is an inspection target, a beveled surface 33A and a vertical surface 33B are irradiated with linear light beams emitted from the light sources 13A and 13B, and the linear light beams form shapes corresponding to the side surfaces of the end shape 33. Accordingly, the shape of a linear light beam corresponding to the side surface of the end shape 33 can be obtained by capturing an image of the linear light beam with an imager and performing image processing on the captured image. Also, the end shape of the gypsum board can be calculated by arranging multiple points for which coordinates are to be calculated along the shape of the linear light beam, i.e., a line, obtaining the coordinates of the points, and calculating the lengths of straight portions corresponding to a surface constituting the end and the angles between the straight portions based on the coordinates.

Specifically, based on the obtained coordinates, it is possible to calculate the positions and lengths of line segments of the beveled surface 33A and line segments of the vertical surface 33B, and calculate the lengths of the beveled surface 33A and the vertical surface 33B and the angle between the beveled surface 33A and the vertical surface 33B.

Although the calculation of the end shape 33 is described here as an example, the length of a vertical surface 31A of the end shape 31 and the angles between the vertical surface 31A, an upper surface 31B, and a lower surface 31C can also be calculated. Also, it is possible to calculate the lengths of a tapered surface 32A and a vertical surface 32B of the end shape 32 and the angle between the tapered surface 32A and the vertical surface 32B. Further, it is possible to calculate the curvature of a round surface 34A of the end shape 34.

The end shape determining unit 21 can determine whether the shapes of the lateral ends 121A and 121B of the inspection target 12 calculated by the end shape calculation unit 20 satisfy standard values. The standard values are not limited to any specific values and may be selected depending on an inspection target to be inspected by the inspection apparatus of the present embodiment.

When the end shape determining unit 21 determines that the shapes of the lateral ends 121A and 121B of the inspection target 12 do not satisfy the standard values, the end shape determining unit 21 may cause the display 19 to display a message indicating that the standard values are not satisfied. When, for example, the inspection apparatus 10 of the present embodiment is incorporated in a plate-shaped object manufacturing apparatus, an output unit of the inspection apparatus 10 may instruct a controller of the plate-shaped object manufacturing apparatus to change manufacturing conditions of the plate-shaped object.

(Width Calculation Unit, Width Determining Unit)

The inspection apparatus 10 of the present embodiment may also include a width calculation unit 22 that calculates the width of the inspection target 12 based on the positions of the imagers 14A and 14B, and a width determining unit 23 that evaluates the width of the inspection target 12 calculated by the width calculation unit 22.

The inspection apparatus of the present embodiment can measure not only the end shape of an inspection target, but also the width of the inspection target, i.e., the length in the width direction.

As described above, in the inspection apparatus 10 of the present embodiment, the imagers 14A and 14B are moved according to the positions of the lateral ends of the inspection target.

For this purpose, the inspection apparatus 10 of the present embodiment further includes a width calculation unit 22. The width calculation unit 22 can calculate the width of the inspection target based on, for example, positional information of the imagers 14A and 14B.

Specifically, the width of the inspection target can be calculated by subtracting the distance between the imager 14A and the end 121A in the width direction of the inspection target 12 and the distance between the imager 14B and the end 121B in the width direction of the inspection target 12 from the distance between the imager 14A and the imager 14B. In the inspection apparatus 10 of the present embodiment, the distances between the imagers 14A and 14B and the inspection target 12 are kept almost constant. Therefore, the distances may be set as constants. Also, for example, the distances between the imagers 14A and 14B and the lateral ends 121A and 121B of the inspection target 12 may be obtained based on the positions, in images captured by the imagers 14A and 14B, of light beams irradiating the side surfaces at the lateral ends 121A and 121B of the inspection target 12.

The inspection apparatus of the present embodiment may further include the width determining unit 23 that determines whether the width of the inspection target 12 calculated by the width calculation unit 22 satisfies, for example, a standard.

The width determining unit 23 can determine whether the width of the inspection target calculated by the width calculation unit 22 satisfies a standard value. The standard value is not limited to any specific value and may be selected depending on an inspection target to be inspected by the inspection apparatus of the present embodiment.

(Functional Block Diagram)

Figure 6:
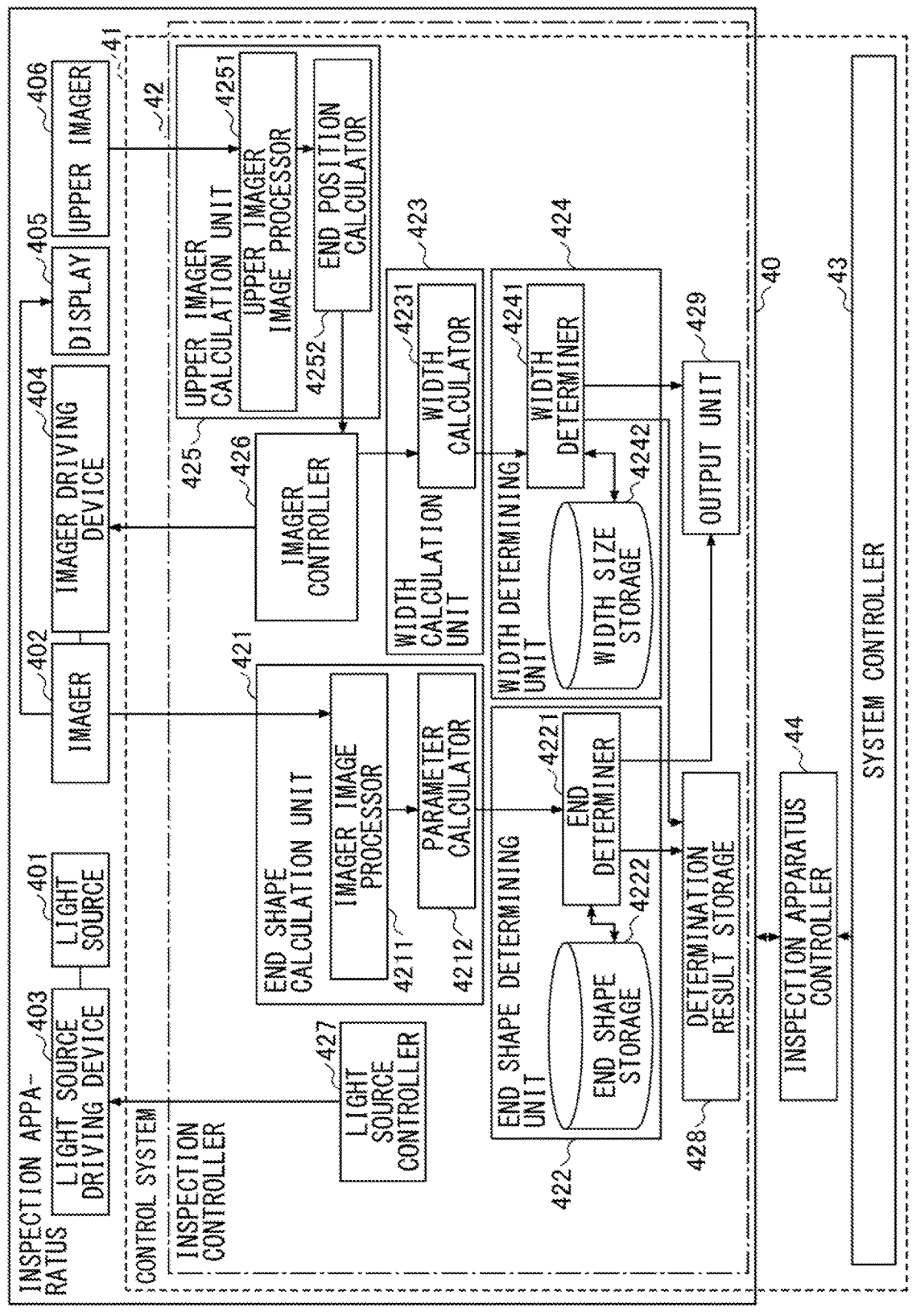
FIG. 6 is a functional block diagram of an inspection apparatus according to an embodiment of the present invention.

FIG. 6 is a functional block diagram of an inspection apparatus of the present embodiment.

An inspection apparatus 40 of the present embodiment may include a light source(s) 401, an imager(s) 402, and an imager driving device 404 as described above. As necessary, the inspection apparatus 40 may also include a light source driving device 403, a display 405, and an upper imager(s) 406.

A control system 41 for controlling the entire inspection apparatus 40 of the present embodiment may include, in addition to an inspection controller 42, a system controller 43 and an inspection apparatus controller 44 that controls the inspection apparatus 40.

The control system 41 is a type of computer, and includes a processor (system controller 43) such as a CPU or an ASIC, a storage device such as a RAM, a ROM, an NVRAM, or an HDD, and a communication unit such as a network interface. CPU is an abbreviation of Central Processing Unit. ROM is an abbreviation of Read Only Memory. RAM is an abbreviation of Random Access Memory. NVRAM is an abbreviation of Non-Volatile RAM.

The inspection controller 42 of the inspection apparatus 40 is described with reference to FIG. 6.

The inspection controller (inspection control unit) 42 of the inspection apparatus 40 includes an end shape calculation unit 421, an end shape determining unit 422, a width calculation unit 423, a width determining unit 424, an upper imager calculation unit 425, an imager controller 426, a light source controller 427, a determination result storage 428, and an output unit 429.

The end shape calculation unit 421 may include, for example, an imager image processor 4211 and a parameter calculator 4212.

The imager image processor 4211 is, for example, an application specific integrated circuit (ASIC), and performs image processing on an image of a linear light beam emitted from the light source 401 to irradiate a side surface at a lateral end of an inspection target and captured by the imager 402.

The imager image processor 4211 can identify the shape of a linear light beam corresponding to the shape of a lateral end of the inspection target based on differences in density or brightness in a captured image. Any method may be used to identify the linear light beam. For example, the linear light beam may be identified by performing image processing such as binarization to distinguish the linear light beam from other portions. In this process, as necessary, the identified shape of the linear light beam may be corrected according to the incident angle of the light beam emitted from the light source 401 and entering the lateral end of the inspection target.

The parameter calculator 4212 can arrange multiple points whose coordinates are to be calculated along the shape of the linear light beam, i.e., a line, obtained by the imager image processor 4211. Then, the parameter calculator 4212 calculates the coordinate positions of the arranged points and calculates the lengths and angles of portions needed by the end shape determining unit 422 described later. For example, in the case of the end shape 33 illustrated in FIG. 5C, the parameter calculator 4212 can calculate the lengths of the beveled surface 33A and the vertical surface 33B and the angle between the beveled surface 33A and the vertical surface 33B.

The end shape determining unit 422 may include an end determiner 4221 and an end shape storage 4222. The end determiner 4221 can determine whether parameters related to the end shape of the inspection target calculated by the parameter calculator 4212 satisfy a standard. Specifically, for example, the end determiner 4221 can determine whether the end shape is acceptable by comparing standard parameters of an acceptable end shape stored in the end shape storage 4222 with the parameters calculated by the parameter calculator 4212.

The end shape calculation unit 421 and the end shape determining unit 422 may be implemented by software in one ASIC. Alternatively, an ASIC may be provided for each of the end shape calculation unit 421 and the end shape determining unit 422, and a part or the whole of each of the end shape calculation unit 421 and the end shape determining unit 422 may be implemented by hardware.

Also, as described above, the inspection apparatus 40 of the present embodiment can calculate the width of the inspection target and determine whether the width is acceptable.

For this purpose, the inspection controller 42 of the inspection apparatus 40 of the present embodiment may also include a width calculation unit 423 for calculating the width (lateral length) of the inspection target and a width determining unit 424.

For example, the width calculation unit 423 can obtain, from the imager controller 426, the position of the imagers 402 connected to the imager driving device 404 for changing the positions of the imagers 402. The width calculator 4231 can calculate the width (lateral length) of the inspection target by subtracting a total of distances between the imagers 402 and the lateral ends of the inspection target from the distance between the two imagers 402. In the inspection apparatus 40 of the present embodiment, the distances between the imagers 402 and the inspection target are kept almost constant. Therefore, the distances between the imagers and the inspection target may be set as constants. Also, for example, the width calculator 4231 can calculate the distances between the imagers 402 and the lateral ends of the inspection target based on the positions of the linear light beams, which illuminate the side surfaces at the lateral ends of the inspection target, in images captured by the imagers 402.

The width determining unit 424 may include a width determiner 4241 and a width size storage 4242. The width determiner 4241 can determine whether a parameter of the width (lateral length) of the inspection target calculated by the width calculator 4231 satisfies a standard. Specifically, for example, the width determiner 4241 can determine whether the width of the inspection target is acceptable by comparing a standard parameter of the width (lateral length) of an acceptable inspection target stored in the width size storage 4242 with the parameter calculated by the width calculator 4231.

The width calculation unit 423 and the width determining unit 424 may be implemented by software in one ASIC. Alternatively, an ASIC may be provided for each unit, and a part or the whole of each unit may be implemented by hardware.

The inspection apparatus 40 of the present embodiment may also include the upper imager 406, and the upper imager calculation unit 425 can detect the end positions of the inspection target based on an image captured by the upper imager 406.

The upper imager calculation unit 425 may include, for example, an upper imager image processor 4251 and an end position calculator 4252.

The upper imager image processor 4251 is, for example, an ASIC and performs image processing on an image captured by the upper imager 406. For example, it is preferable to emit a linear light beam extending along the width direction of the inspection target from an upper imager light source to irradiate the inspection target and capture the light beam with the upper imager 406.

The upper imager image processor 4251 can identify the shape of the linear light beam based on differences in density or brightness in the captured image.

The end position calculator 4252 can calculate the positions of bending points of the linear light beam based on the shape of the linear light beam obtained by the upper imager image processor 4251. At the lateral ends of the inspection target, steps are formed between the inspection target and the upper surface of the conveying unit. Accordingly, bending points are formed in the linear light beam extending along the width direction of the inspection target at positions corresponding to the steps. Therefore, the end positions can be calculated by calculating the coordinates of the bending points.

Then, for example, at the start of inspection, the positions of the imagers 402 are controlled based on the end positions calculated by the upper imager calculation unit 425, and the positions of the imagers 402 can be moved to appropriate positions.

Also, for example, to adjust the incident angles of light beams emitted from the light sources 401 and entering the inspection target, the light source controller 427 can output commands to the light source driving device 403 based on position information from, for example, the imager controller 426 and thereby control the positions of the light sources 401.

An inspection program that performs operations corresponding to the image processing and the determination processes described above is stored in a storage device of the control system 41. The system controller (CPU) 43 operates according to the inspection program to implement inspection functions described above.

The inspection program may be provided as an installable or executable file stored in a computer-readable storage medium such as a CD-ROM or a flexible disk (FD). Also, the inspection program may be recorded and provided in a computer-readable storage medium such as a CD-R, a DVD, a Blu-ray disc (registered trademark), or a semiconductor memory. DVD is an abbreviation of Digital Versatile Disk. The inspection program may also be installed via a network such as the Internet. Further, a part or the whole of the inspection program may be stored in advance in, for example, a ROM in a device (for example, the imager 14A/14B).

Although the end shape storage 4222, the width size storage 4242, and the determination result storage 428 are provided separately in FIG. 6, data in those storages may be stored in the same storage device such as a RAM, a ROM, an NVRAM, or an HDD.

As described above, the determination results of the end determiner 4221 and the width determiner 4241 may be stored in the determination result storage 428 and may be output via the output unit 429 for later confirmation. Any output destination and output method may be used for this purpose. For example, a message indicating whether the inspection target satisfies the standard may be displayed on the display 405. Also, the inspection apparatus 40 of the present embodiment may be incorporated in a plate-shaped object manufacturing apparatus, and the determination results may be output to a controller for controlling the plate-shaped object manufacturing apparatus. For example, when it is determined that the end shape or the width of the inspection target does not satisfy the standard, an instruction may be output to the controller of the plate-shaped object manufacturing apparatus to cause the controller to change, for example, molder conditions.

The inspection apparatus of the present embodiment described above can accurately inspect an end shape of a plate-shaped object even when the position of an end of the plate-shaped object in the width direction orthogonal to the conveying direction of a conveying unit changes in a direction orthogonal to the conveying direction.

[Plate-Shaped Object Manufacturing Apparatus]

An example of a configuration of a plate-shaped object manufacturing apparatus of the present embodiment is described.

The plate-shaped object manufacturing apparatus of the present embodiment is for manufacturing a plate-shaped object.

The plate-shaped object manufacturing apparatus of the present embodiment may include the above-described inspection apparatus that inspects an intermediate body of a plate-shaped object or the plate-shaped object as an inspection target.

Here, a plate-shaped object indicates an end product manufactured by the plate-shaped object manufacturing apparatus of the present embodiment. Also, an intermediate body of the plate-shaped object indicates an unfinished product such as a continuous plate-shaped object, i.e., a band-shaped object, or a roughly-cut object obtained by roughly cutting the band-shaped object.

The plate-shaped object manufactured by the plate-shaped object manufacturing apparatus of the present embodiment is not limited to any particular type of product. Examples of plate-shaped objects include gypsum building materials, parts for electronic components, other ceramic products such as structural materials, and resin products.

Examples of gypsum building materials include a gypsum board, a glass mat gypsum board, and a gypsum board containing glass fiber non-woven fabric. Therefore, a gypsum board may be used as an example of a plate-shaped object manufactured in a plate-shaped object manufacturing method of the of the present embodiment.

Particularly, a gypsum board, which is a type of a gypsum building material, is often required to have a predetermined lateral end shape as illustrated in FIGS. 5A through 5D. Therefore, the plate-shaped object manufactured by the plate-shaped object manufacturing apparatus of the present embodiment is preferably a gypsum building material and more preferably a gypsum board.

Figure 7:
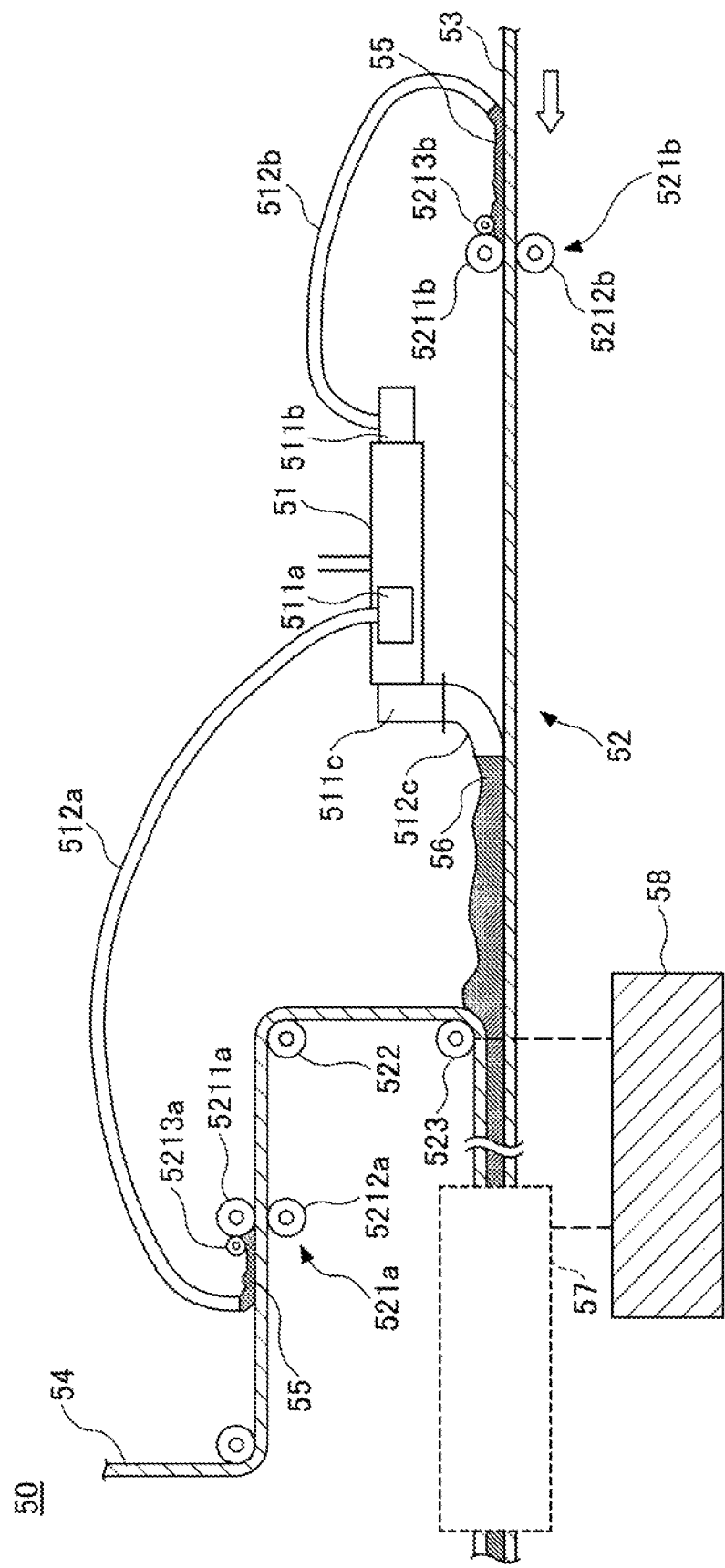
FIG. 7 is a drawing illustrating a plate-shaped object manufacturing apparatus according to an embodiment of the present invention.

Here, an example of a configuration of the plate-shaped object manufacturing apparatus of the present embodiment is described with reference to FIG. 7. In FIG. 7, it is assumed that a gypsum board, which is a type of a gypsum building material, is manufactured as a plate-shaped object.

The plate-shaped object manufacturing apparatus of the present embodiment may include various components necessary for manufacturing a plate-shaped object in addition to the inspection apparatus described above.

For example, when it is necessary to mix raw materials, the plate-shaped object manufacturing apparatus of the present embodiment may include a mixing unit (mixer) for mixing the raw materials. Also, the plate-shaped object manufacturing apparatus of the present embodiment may include a molding apparatus for molding and processing a raw material, a raw material mixture prepared by the mixer, or raw material slurry into a desired shape and size.

Below, an example of a configuration of the plate-shaped object manufacturing apparatus of the present embodiment is described based on an assumption that a gypsum board is manufactured as a plate-shaped object.

A plate-shaped object manufacturing apparatus 50 illustrated in FIG. 7 includes a mixer 51, which is a mixing unit for mixing raw materials, a molding apparatus 52 that molds raw material slurry (gypsum slurry in the example of FIG. 7) prepared by the mixer 51, and an inspection apparatus 57. The exemplary configuration of the apparatus is described below in details.

First, the mixer 51 is described.

The mixer 51 may be disposed in a predetermined position relative to a conveying line of front cover base paper described later, for example, above or alongside the conveying line. By one mixer 51, raw materials of the gypsum slurry including calcined gypsum, water, and optionally, additives are kneaded to prepare the gypsum slurry.

Calcined gypsum is also called calcium sulfate hemihydrate, and is an inorganic composition having a hydraulic property. Examples of calcined gypsum include β-calcined gypsum obtained by calcining one of or a mixture of natural gypsum, by-product gypsum, and flue-gas gypsum in the atmosphere; α-calcined gypsum obtained by calcining one of or a mixture of natural gypsum, by-product gypsum, and flue-gas gypsum in water (or vaper); and a mixture of the β-calcined gypsum and the α-calcined gypsum.

When manufacturing a gypsum building material such as a gypsum board, calcined gypsum used as a raw material preferably includes β-calcined gypsum, and the primary component of calcined gypsum used as a raw material of a gypsum building material is preferably β-calcined gypsum. Here, β-calcined gypsum can be referred to as the primary component of calcined gypsum used as a raw material of a gypsum building material when the mass percentage of β-calcined gypsum in the calcined gypsum is greater than 50%. When manufacturing a gypsum building material, the calcined gypsum used as a raw material may be composed solely of β-calcined gypsum.

To manufacture α-calcined gypsum, it is necessary to pressure-sinter dihydrate gypsum such as natural gypsum in water or steam by using an autoclave. On the other hand, β-calcined gypsum can be manufactured by pressureless-sintering dihydrate gypsum such as natural gypsum in the atmosphere. Thus, compared with α-calcined gypsum, β-calcined gypsum can be manufactured more efficiently.

As additives, for example, one or more of the following may be used: an adhesion improver such as starch or polyvinyl alcohol for improving the adhesion between hardened gypsum (cured gypsum slurry) and gypsum-board base paper (which is hereafter referred to as "front cover base paper" or "back cover base paper"); inorganic fibers such as glass fibers; lightweight aggregate; a refractory such as vermiculite; a setting retarder; a setting accelerator; a water-reducing agent; a bubble-diameter adjuster such as sulfosuccinate surfactant; a water repellent such as silicone or paraffin; organic carboxylic acid; and organic carboxylate.

Here, calcined gypsum and some additives such as solid additives may be mixed and agitated beforehand, and the resulting gypsum composition may be supplied to the mixer 51.

Also, foam may be added at one or more of gypsum-slurry splitting ports 511a, 511b, and 511c, and gypsum slurry with a desired density may be obtained by adjusting the amount of foam added. For example, high-density gypsum slurry 55 may be prepared by not adding foam or by adding a small amount of foam from the splitting ports 511a and 511b. Also, low-density gypsum slurry 56 may be prepared by adding, from the splitting port 511c, an amount of foam greater than the amount of foam added to the high-density gypsum slurry 55.

Thus, the mixer 51 of the plate-shaped object manufacturing apparatus 50 can perform a gypsum slurry manufacturing process where raw materials including calcined gypsum, water, additives (as necessary), and foam are mixed and kneaded to prepare two types of gypsum slurry 55 and 56.

Delivery pipes 512a and 512b and a pipe line 512c for supplying prepared gypsum slurry to the molding apparatus 52 may be connected to the splitting ports 511a, 511b, and 511c.

In the example of FIG. 7, low-density gypsum slurry and high-density gypsum slurry are manufactured by one mixer 51. However, two mixers may be provided, and low-density gypsum slurry and high-density gypsum slurry may be produced by the corresponding mixers.

Next, an exemplary configuration of the molding apparatus 52 is described.

The molding apparatus may include, for example, roller coaters 521a and 521b for spreading gypsum slurry onto front cover base paper 53 and back cover base paper 54, and a molder 523.

In FIG. 7, the front cover base paper 53, which is a surface material, is conveyed along a production line from right to left.

The high density gypsum slurry 55 obtained by the mixer 51 is supplied onto the front cover base paper 53 and the back cover base paper 54 at positions upstream of the roller coaters 521a and 521b in the conveying direction via the delivery pipes 512a and 512b.

The high density gypsum slurry 55 supplied onto the front cover base paper 53 and the back cover base paper 54 reaches spreading sections of the roller coaters 521a and 521b and is spread at the spreading sections. The roller coaters 521a and 521b may include coating rollers 5211a and 5211b, receiving rollers 5212a and 5212b, and waste removing rollers 5213a and 5213b, respectively. When the cover base paper passes through a space between the coating roller 5211a/5211b and the receiving roller 5212a/5212b, the gypsum slurry 55 is spread on the front cover base paper 53 or the back cover base paper 54.

Thus, a thin layer of the gypsum slurry 55 is formed on the front cover base paper 53. Then, the front cover base paper 53 is folded such that its side edges extend upward and then extend inward. A thin layer is also formed on the back cover base paper 54. However, unlike the front cover base paper 53, the back cover base paper 54 is not folded. In the example of FIG. 7, the gypsum slurry 55 is applied to the from cover base paper 53 and the back cover base paper 54 using the roller coaters 521a and 521b. However, the present invention is not limited to this example. For example, the gypsum slurry 55 may be only applied to one of the front cover base paper 53 and the back cover base paper 54 using the roller coater 521*a* or 521*b*. Also, the gypsum slurry 55 may be placed only on the side edges at the lateral ends of the front cover base paper 53.

The front cover base paper 53 is conveyed in the same conveying direction. On the other hand, the conveying direction of the back cover base paper 54 is changed by a turning roller 522 toward the conveying line of the front cover base paper 53. Then, both of the front cover base paper 53 and the back cover base paper 54 are conveyed in the same direction and reach the molder 523. Here, the low-density gypsum slurry 56 is supplied from the mixer 51 via the pipe line 512*c* to a space between the thin layers formed on the front cover base paper 53 and the back cover base paper 54. As a result, a continuous layered structure, in which a layer formed of the high-density gypsum slurry 55, a layer formed of the low-density gypsum slurry 56, and a layer formed of the high-density gypsum slurry 55 are stacked in this order, is formed between the front cover base paper 53 and the back cover base paper 54. Then, the layered structure passes through the molder 523 that determines the thickness of the gypsum board and is thereby molded. Thus, a gypsum board can be formed through the above process.

Also, instead of using high-density gypsum slurry and low-density gypsum slurry, one type of gypsum slurry with a given density may be produced and supplied onto gypsum board base paper.

In this case, for example, gypsum slurry with a predetermined density is supplied onto front cover base paper, which is being continuously conveyed, to deposit a layer of the gypsum slurry. Then, lateral side edges of the front cover base paper are folded along predetermined engraved lines to extend upward and then extend inward. As a result, the deposited layer of the gypsum slurry is partially wrapped by the front cover base paper. Then, back cover base paper, which is conveyed at the same speed, is placed on the deposited layer of the gypsum slurry partially wrapped by the front cover base paper. Then, the resulting structure is caused to pass through a molder that determines the thickness and the width of a gypsum board. Thus, a gypsum board can also be formed through the above process. In this case, a layer of gypsum slurry with the same density is formed between the front cover base paper and the back cover base paper.

Thus, the molding apparatus 52 of the plate-shaped object manufacturing apparatus 50 can perform a molding step for molding gypsum slurry, and can thereby manufacture a molded body of gypsum slurry, which is a plate-shaped object and an intermediate product of a gypsum board.

The inspection apparatus 57 described above may be disposed downstream of the molding apparatus 52. As necessary, the inspection apparatus 57 can inspect a plate-shaped object, which is an inspection target being conveyed, i.e., a molded body of gypsum slurry. After the inspection by the inspection apparatus 57, additional processes are performed as necessary to form a plate-shaped object such as a gypsum board.

The configuration of the inspection apparatus 57 is already described above, and therefore its descriptions are omitted here. If a plate-shaped object, which is a product or an intermediate product, that does not satisfy the standard is detected as a result of inspection performed by the inspection apparatus 57, a message indicating that the plate-shaped object is out of standard may be displayed on the display 19 of the inspection apparatus (see FIGS. 1 through 4). Also, a report indicating the detection of an out-of-standard product or intermediate product may be sent via the output unit 429 (see FIG. 6) of the inspection apparatus to the controller 58 of the plate-shaped object manufacturing apparatus 50. In this case, the plate-shaped object manufacturing apparatus 50 may eject the detected out-of-standard product or intermediate product from the production line or shipments at a given timing. When the plate-shaped object manufacturing apparatus 50 of the present embodiment includes, for example, a cutting device described later, after the plate-shaped object is cut by the cutting device, a rough cut piece or a cut piece with a product size including an out-of-standard part may be ejected from the production line or shipments.

When the plate-shaped object manufacturing apparatus is used to manufacture a gypsum board as a plate-shaped object as described with reference to FIG. 7, the controller 58 of the plate-shaped object manufacturing apparatus may be configured to output an instruction to change, for example, molding conditions of the molder 523. Also, for example, the controller 58 may be configured to instruct a device for forming engraved lines for folding the front cover base paper 53 to change the positions and depths of the engraved lines.

In the above example, it is assumed that a gypsum board, which is a type of a gypsum building material, is manufactured as a plate-shaped object. However, the present invention is not limited to this example. For example, various gypsum building materials other than a gypsum board such as a glass-mat gypsum board and a glass-fiber nonwoven-fabric gypsum board may be manufactured by replacing gypsum board base paper used as a surface material with a glass fiber nonwoven fabric (glass tissue) or a glass mat and placing it on the surface of gypsum slurry or embedding it near the surface of gypsum slurry.

It is also possible to manufacture various types of plate-shaped objects other than gypsum building materials, such as parts for electronic components, other ceramic products such as various structural materials, and resin products.

When manufacturing other ceramic products (a slag gypsum board, a cement board, etc.) or resin products instead of gypsum building materials as plate-shaped objects, the configurations of the mixer and the molding apparatus are not limited to those described above, and the configurations of the mixer and the molding apparatus may be determined depending on raw materials and a product to be manufactured.

Also, as necessary, the plate-shaped object manufacturing apparatus of the present embodiment may further include various devices and units in addition to the mixing unit such as a mixer, the molding apparatus, and the inspection apparatus described above.

For example, the plate-shaped object manufacturing apparatus of the present embodiment may include a drying unit for drying a molded body of slurry and a cutting unit for cutting an object according to the size of a product.

Further, the number of inspection apparatuses 57 included in the plate-shaped object manufacturing apparatus of the present embodiment is not limited to one. Any number of inspection apparatuses 57 may be provided at positions on a line of the manufacturing apparatus where evaluation is necessary.

The plate-shaped object manufacturing apparatus of the present embodiment described above includes the inspection apparatus described above. Accordingly, the plate-shaped object manufacturing apparatus can manufacture a plate-shaped object with high yield by accurately evaluating the lateral end shape and the width of an intermediate product or a product of the plate-shaped object being manufactured and conveyed and by correcting the manufacturing conditions.

[Inspection Method]

Next, an inspection method of the present embodiment is described. Because the inspection method of the present embodiment can be performed using, for example, the inspection apparatus described above, repeated descriptions of some of the subjects described above are omitted here.

The inspection method of the present embodiment is a method for inspecting a plate-shaped inspection target being conveyed and may include the following steps.

A light emission step of causing a light source to emit a linear light beam extending along the thickness direction of the inspection target to irradiate a side surface at a lateral end of the inspection target in a width direction orthogonal to the conveying direction of the inspection target.

An imager position control step of controlling the position of an imager according to the position of the lateral end of the inspection target such that the imager is able to capture the light beam emitted from the light source and irradiating the side surface at the lateral end of the inspection target.

An imaging step of causing the imager to capture the light beam emitted from the light source and irradiating the side surface at the lateral end of the inspection target.

The inspection method of the present embodiment may include the light emission step of irradiating the side surface at the lateral end of the inspection target with the linear light beam extending along the thickness direction of the inspection target. Also, the inspection method of the present embodiment may include the imaging step of causing the imager to capture the light beam emitted from the light source and irradiating the side surface at the lateral end of the inspection target.

In the light emission step, the linear light beam emitted from the light source to irradiate the side surface at the lateral end of the inspection target and extending along the thickness direction of the inspection target may form a shape corresponds to the shape of the side surface of the inspection target. Therefore, by capturing an image of the shape of the light beam with the imager in the imaging step and monitoring the shape, it is possible to check a change in the shape of the lateral end of the inspection target and determine whether the shape of the lateral end of the inspection target is acceptable. Also, for example, it is possible to calculate parameters of the shape of the lateral end of the inspection target based on the captured shape of the light beam, and determine whether the shape of the lateral end of the inspection target is acceptable.

However, as described above, the position of the lateral end of the inspection target, or the plate-shaped object, being conveyed may change. For this reason, the inspection method of the present embodiment may include the imager position control step where the position of the imager is controlled according to the position of the lateral end of the inspection target so that the light beam emitted from the light source and irradiating the side surface at the lateral end of the inspection target can be captured. In the imager position control step, it is preferable to control the position of the imager in the width direction according to the position of the lateral end of the inspection target. Performing the imager position control step makes it possible to keep the distance between the imager and the lateral end of the inspection target constant and to accurately evaluate the shape of the lateral end of the plate-shaped inspection target being conveyed.

The light emission step, the imager position control step, and the imaging step may be simultaneously and continuously performed while, for example, the inspection target is being conveyed.

The position of the light source used in the light emission step and the position of the imager used in the imaging step are not limited to specific positions and may be determined such that the side surface at the lateral end of the inspection target can be irradiated with a light beam and the light beam can be captured. Particularly, the light emitter of the light source and the light receiver of the imager are preferably located in positions higher than the lower surface of the inspection target to more reliably prevent the light beam from being blocked by, for example, the conveying unit.

In the inspection method of the present embodiment, at the start of inspection, for example, the position of the imager may be adjusted based on an image captured by the imager such that the distance between the imager and the lateral end of the inspection target falls within a predetermined range. However, the position of the imager may also be controlled by using the upper imager described above so that the position of the imager can be controlled more appropriately.

For this purpose, the inspection method of the present embodiment may further include an end position detection step of detecting the position of the lateral end of the inspection target with, for example, an upper imager disposed above the inspection target being conveyed.

In the imager position control step, the position of the imager may be controlled based on the detection result in the end position detection step.

In the end position detection step, for example, a linear light beam extending along the width direction of the inspection target may be emitted from the upper imager light source described above, and the linear light beam may be captured by the upper imager to detect the position of the lateral end of the inspection target.

Then, in the imager position control step, the position of the imager, specifically, the position of the imager in the width direction, may be controlled based on information on the detected position of the lateral end of the inspection target.

Here, while the light emission step and the imaging step described above are continuously performed, the position of the imager can be easily controlled based on images captured in the imaging step. Therefore, for example, the end position detection step may be performed only at the start of inspection.

According to the study conducted by the inventor of the present invention, depending on the incident angle of a linear light beam emitted from the light source to irradiate a side surface at the lateral end of the inspection target, the shape of the linear light beam irradiating the side surface at the lateral end of the inspection target may become different from the shape in the thickness direction of the side surface at the lateral end of the inspection target, and a correction may become necessary. Such a correction is performed based on the incident angle of the light beam emitted from the light source and entering the side surface at the lateral end of the inspection target.

Therefore, it is preferable to adjust the position of the light source so that the incident angle of the linear light beam emitted from the light source and entering the lateral end of the inspection target becomes a desired value. For this reason, the inspection method of the present embodiment may also include a light source position control step of controlling the position of the light source such that the incident angle of the light beam entering the side surface at the lateral end of the inspection target becomes a predetermined angle.

Although not limited to any specific value, the incident angle of the light beam emitted from the light source and entering the side surface at the lateral end of the inspection target to be controlled in the light source position control step is preferably greater than or equal to 30 degrees and less than or equal to 60 degrees and is more preferably greater than or equal to 40 degrees and less than or equal to 50 degrees. The incident angle is particularly preferably 45 degrees. When the incident angle is 45 degrees, the shape of the light beam irradiating the side surface at the lateral end of the inspection target becomes the same as the shape of the side surface at the lateral end of the inspection target, and needs not to be corrected.

Although the light source position control step may be performed at any timing, the light source position control step may be continuously performed, for example, while the light emission step, the imaging step, and the imager position control step are performed.

In the inspection method of the present embodiment, as described above, the shape of the light beam captured in the imaging step may be monitored to check a change in the shape of the lateral end of the inspection target and determine whether the inspection target is acceptable. Also, for example, it is possible to calculate parameters of the shape of the lateral end of the inspection target based on the shape of the light beam captured by the imager and determine whether the shape of the lateral end of the inspection target is acceptable.

For this purpose, the inspection method of the present embodiment may further include the following steps.

An end shape calculation step of calculating the shape of the lateral end of the inspection target based on the shape of the light beam that is emitted from the light source to irradiate the side surface at the lateral end of the inspection target and is captured in the imaging step.

An end shape determination step of evaluating the shape of the lateral end of the inspection target calculated in the end shape calculation step.

In the end shape calculation step, for example, the lengths of predetermined surfaces at the lateral end of the inspection target and the angle between the surfaces constituting the end may be calculated. Because specific calculation methods are already described above, their descriptions are omitted here.

In the end shape determination step, the shape such as parameters of the lateral end of the inspection target calculated in the end shape calculation step may be compared with preset standard values to determine whether the end shape is acceptable.

Also, in the inspection method of the present embodiment, the imager is moved according to the position of the lateral end of the inspection target. Therefore, the length of the inspection target in the width direction may be calculated based on the position information of the imager.

For this purpose, the inspection method of the present embodiment may further include the following steps.

A width calculation step of calculating the width of the inspection target based on the position of the imager.

A width determination step of evaluating the width of the inspection target calculated in the width calculation step.

In the width calculation step, for example, the width (lateral length) of the inspection target may be calculated by subtracting the distance between the imager 14A and the lateral end 121A of the inspection target 12 and the distance between the imager 14B and the lateral end 121B of the inspection target 12 from the distance between the imager 14A and the imager 14B illustrated in FIGS. 1 through 4. In the inspection method of the present embodiment, the imager is moved according to the position of the lateral end of the inspection target. Therefore, for example, the distances between the imagers 14A and 14B in the inspection apparatus 10 and the lateral ends 121A and 121B of the inspection target 12 illustrated in FIGS. 1 through 4 are kept almost constant. Accordingly, the distance between the imager and the lateral end of the inspection target may be set as a constant. Also, for example, the distances between the imagers 14A and 14B and the lateral ends 121A and 121B of the inspection target 12 may be obtained based on the positions, in images captured by the imagers 14A and 14B, of light beams irradiating the side surfaces at the lateral ends 121A and 121B of the inspection target 12.

Then, in the width determination step, it is possible to determine whether the width (lateral length) of the inspection target calculated in the width calculation step satisfies, for example, a standard value. The standard value may be selected depending on the inspection target inspected by the inspection method of the present embodiment, and is not limited to any specific value.

The inspection method of the present embodiment described above makes it possible to accurately inspect an end shape of a plate-shaped object even when the position of a lateral end of the plate-shaped object in the width direction orthogonal to the conveying direction of the plate-shaped object on the conveying unit changes in a direction orthogonal to the conveying direction.

[Plate-Shaped Object Manufacturing Method]

A plate-shaped object manufacturing method of the present embodiment is a method for manufacturing a plate-shaped object and may include an inspection step of inspecting an inspection target such an intermediate body of the plate-shaped object or the plate-shaped object according to the inspection method described above.

Here, the plate-shaped object indicates an end product manufactured by the plate-shaped object manufacturing method of the present embodiment. Also, an intermediate body of the plate-shaped object indicates an unfinished product such as a continuous plate-shaped object, i.e., a band-shaped object, or a roughly-cut object obtained by roughly cutting the band-shaped object.

The plate-shaped object manufactured by the plate-shaped object manufacturing method of the present embodiment is not limited to any particular type of product. Examples of plate-shaped objects include gypsum building materials, parts for electronic components, other ceramic products such as structural materials, and resin products.

Examples of gypsum building materials include a gypsum board, a glass mat gypsum board, and a gypsum board containing glass fiber non-woven fabric. Therefore, a gypsum board may be used as an example of a plate-shaped object manufactured by the plate-shaped object manufacturing method of the of the present embodiment.

Particularly, a gypsum board, which is a type of a gypsum building material, is often required to have a predetermined lateral end shape as illustrated in FIGS. 5A through 5D. Therefore, the plate-shaped object manufactured in the plate-shaped object manufacturing method of the present embodiment is preferably a gypsum building material and more preferably a gypsum board.

Here, it is assumed that a gypsum building material, particularly a gypsum board, is manufactured as the plate-shaped object.

When a gypsum board is manufactured as a plate-shaped object, the plate-shaped object manufacturing method may include the following steps.

A gypsum slurry preparation step of preparing gypsum slurry by mixing and kneading calcined gypsum, water, and in some cases, various additives that are raw materials of the gypsum slurry.

A molding step of supplying the gypsum slurry onto cover base paper and molding the gypsum slurry into a plate shape.

A hardening step of hardening the plate-shaped molded body obtained in the molding step. Each of the steps is described below.

(Gypsum Slurry Preparation Step)

In the gypsum slurry preparation step, gypsum slurry may be prepared by mixing and kneading calcined gypsum, water, and in some cases, various additives and foam.

For example, as in the descriptions of the plate-shaped object manufacturing apparatus, these raw materials may be kneaded with, for example, a mixer to prepare gypsum slurry. Because the raw materials of gypsum slurry are already described above, their descriptions are omitted here.

(Molding Step)

In the molding step, the gypsum slurry obtained in the gypsum slurry preparation step is supplied onto cover base paper and molded into a plate shape.

As described with reference to FIG. 7 in relation to the plate-shaped object manufacturing apparatus, the high-density gypsum slurry 55 and the low-density gypsum slurry 56 with different densities are prepared, and a continuous layered structure, in which a layer formed of the high-density gypsum slurry 55, a layer formed of the low-density gypsum slurry 56, and a layer formed of the high-density gypsum slurry 55 are stacked in this order, is formed between the front cover base paper 53 and the back cover base paper 54. Then, the layered structure is caused to pass through the molder 523, which determines the thickness of a gypsum board, and is thereby molded into a plate shape.

(Hardening Step)

Next, the hardening step may be performed. The hardening step is a step for hardening she molded body obtained in the molding step.

In the hardening step, acicular crystals of dihydrate gypsum are formed due to hydration reaction and as a result, calcined gypsum (hemihydrate gypsum) in gypsum slurry sets and solidifies. Accordingly, in the hardening step, the calcined gypsum and water added to the gypsum slurry react with each other in the molded body formed by the molding step, and the hydration reaction of the calcined gypsum proceeds.

When a gypsum board is manufactured as a plate-shaped object, the plate-shaped object manufacturing method may further include additional steps. For example, the plate-shaped object manufacturing method may include the following steps.

A first cutting step of cutting the molded body of the gypsum slurry.

A drying step of drying the cut molded body of the gypsum slurry.

A second cutting step of cutting a gypsum board.

(First Cutting Step)

In the first cutting step, the molded body of the gypsum slurry may be cut. Here, after the molded body of the gypsum slurry is formed in the molding step, the gypsum slurry gradually hardens. Therefore, the first cutting step may be performed, for example, during the hardening step or after the hardening step is completed. The first cutting step is preferably performed after the hardening step proceeds to such an extent that the molded body of the gypsum slurry can be cut.

The first cutting step may also be referred to as a rough cutting step in which the gypsum slurry is cut into a desired size according to, for example, the size of a dryer used in the drying step described later.

(Drying Step)

In the drying step, excess water contained in the molded body of the gypsum slurry may be dried. The molded body that has gone through the hardening step may be supplied to the drying step. The drying step may be performed by forcibly drying the molded body using a dryer.

Any method may be used to forcibly dry the molded body using a dryer. For example, a dryer may be provided on a conveying path of the molded body, and the molded body may be dried continuously by causing the molded body to pass through the dryer. Alternatively, a batch of molded bodies may be carried into a dryer to simultaneously dry the molded bodies in the same batch.

(Second Cutting Step)

For example, when a gypsum board is manufactured as a plate-shaped object, the plate-shaped object manufacturing method may include the second cutting step of cutting the gypsum board.

The second cutting step may be performed, for example, after the drying step to cut the gypsum board into a desired product size.

The plate-shaped object manufacturing method of the present embodiment may include an inspection step of inspecting an inspection target such an intermediate body of the plate-shaped object or the plate-shaped object according to the inspection method described above.

When the gypsum board is manufactured as a plate-shaped object, for example, after the molded body of gypsum slurry, which is a plate-shaped object, is formed in the molding step, the inspection step may be performed any number of times at any timing.

For example, the inspection method described above can inspect the end shape and the width of a plate-shaped object. Therefore, for example, the inspection step is preferably performed after steps that may change the shape and size of the molded body of gypsum slurry or the gypsum board to be inspected.

For example, the inspection step may be performed immediately after the molding step described above to inspect the shape of the molded body of gypsum slurry. Also, for example, the inspection step may be performed immediately after the first cutting step, the second cutting step, and the drying step to inspect the shape of the molded body of gypsum slurry or the shape of the gypsum board.

When the inspection step is performed and a plate-shaped object such as a product or an intermediate product that does not satisfy, for example, a standard is detected as a result of the inspection step, a message indicating that the plate-shaped object is out of standard may be displayed on the display 19 (see FIGS. 1 through 4) of the inspection apparatus. Also, a report indicating the detection of an out-of-standard product or intermediate product may be sent to the controller 58 of the plate-shaped object manufacturing apparatus 50. When the plate-shaped object manufacturing apparatus is used to manufacture a gypsum board as a plate-shaped object as described with reference to FIG. 7, the controller 58 of the plate-shaped object manufacturing apparatus may output an instruction to change, for example, molding conditions of the molder 523. Also, for example, the controller 58 may be configured to instruct a device for forming engraved lines for folding the front cover base paper 53 to change the positions and depths of the engraved lines.

Further, as necessary, an ejection process may be performed to eject a non-standard plate-shaped object such as a product or an intermediate product from the production line or shipments. The ejection step may be performed at any appropriate timing. For example, the ejection step may be performed after the first cutting step described above and before the drying step. Also, after the second cutting step described above, a non-standard product may be separated from acceptable products to be shipped and then ejected.

In the above example, it is assumed that a gypsum board, which is a type of a gypsum building material, is manufactured as a plate-shaped object. However, the present invention is not limited to this example. For example, various gypsum building materials other than a gypsum board such as a glass-mat gypsum board and a glass-fiber nonwoven-fabric gypsum board may be manufactured by replacing gypsum board base paper used as a surface material with a glass fiber nonwoven fabric (glass tissue) or a glass mat and placing it on the surface of gypsum slurry or embedding is near the surface of gypsum slurry.

It is also possible to manufacture various types of plate-shaped objects other than gypsum building materials, such as parts for electronic components, other ceramic products such as various structural materials, and resin products.

The plate-shaped object manufacturing method of the present embodiment described above includes the inspection step performed according to the inspection method described above. This makes it possible to accurately evaluate the lateral end shape and the width of an intermediate product or a product of a plate-shaped object being manufactured and conveyed.

An inspection apparatus, a plate-shaped object manufacturing apparatus, an inspection method, and a plate-shaped object manufacturing method according to the embodiment are described above. However, the present invention is not limited to the above-described embodiment, and variations and modifications may be made without departing from the scope of the present invention described in the claims.

The present international application is based on and claims priority to Japanese Patent Application No. 2018-093297 filed on May 14, 2018, the entire contents of which are hereby incorporated herein by reference.

EXPLANATION OF REFERENCE NUMERALS 10, 10', 40, 57 inspection apparatus
11 conveying unit
12 inspection target
121A, 121B end
121C lower surface
13A, 13B, 401 light source
131A linear light beam
14A, 14B, 402 imager
15, 404 imager driving device
151, 426 imager controller
16A, 16B, 16', 403 light source driving device
17A, 17B, 406 upper imager
18, 18', 427 light source controller
19, 405 display
20, 421 end shape calculation unit
21, 422 end shape determining unit
22, 423 width calculation unit
23, 424 width determining unit
50 plate-shaped object manufacturing apparatus

The invention claimed is:

1. An inspection apparatus for inspecting an inspection target having a band shape being conveyed linearly, the inspection apparatus comprising:
   a plurality of light sources, including a first source configured to emit a linear light beam extending along a thickness direction of the inspection target to irradiate a side surface at a first lateral end of the inspection target in a width direction orthogonal to a conveying direction of the inspection target, and a second light source configured to emit a linear light beam extending along the thickness direction of the inspection target to irradiate a side surface at a second lateral end of the inspection target opposite to the first lateral end;
   a plurality of imagers, including a first imager configured to capture the linear light beam emitted from the first light source and irradiating the side surface at the first lateral end of the inspection target, and a second imager configured to capture the linear light beam emitted from the second light source and irradiating the side surface at the second lateral end of the inspection target;
   an imager driver configured to move the first imager and the second imager;
   an imager controller configured to control a position of the first imager and a position of the second imager;
   a light source driver configured to change a location of the first light source and a location of the second light source along the conveying direction of the inspection target or along the width direction perpendicular to the conveying direction of the inspection target; and
   a light source controller configured to control the locations of the first light source and the second light source such that an incident angle of each light beam entering the side surface at the first and second lateral ends of the inspection target becomes a predetermined angle; and
   an upper imager disposed over the first imager and the second imager, wherein the upper imager is configured to detect the first lateral end and the second lateral end of the inspection target,
   wherein the imager controller is configured to control, while conveying the inspection target along the conveying direction, the positions of the first imager and the second imager along the width direction respectively based on a variation of a position of the first lateral end and a position of the second lateral end of the inspection target along the width direction, the variation being detected by the upper imager, and
   wherein the first light source, the second light source, the first imager, and the second imager are arranged in a same plane so as to overlap a side of the inspection target.

2. The inspection apparatus as claimed in claim 1, wherein a light emitter of the first light source and a light receiver of the first imager are located in positions higher than a lower surface of the inspection target.

3. The inspection apparatus as claimed in claim 1, further comprising:
   a display configured to display an image of the light beam that is emitted from the first light source to irradiate the side surface at the first lateral end of the inspection target and is captured by the first imager.

4. The inspection apparatus as claimed in claim 1, further comprising:
   an end shape calculation unit including processing circuitry configured to calculate a shape of the first lateral end of the inspection target based on a shape of the light beam that is emitted from the first light source to irradiate the side surface at the first lateral end of the inspection target and is captured by the first imager; and an end shape determining unit including processing circuitry configured to evaluate the shape of the first lateral end of the inspection target calculated by the end shape calculation unit.

5. The inspection apparatus as claimed in claim 1, further comprising:
 a width calculation unit including processing circuitry configured to calculate a width of the inspection target based on the position of the first imager and the position of the second imager, and
 a width determining unit including processing circuitry configured to evaluate the width of the inspection target calculated by the width calculation unit.

6. A plate-shaped object manufacturing apparatus for manufacturing a plate-shaped object, the plate-shaped object manufacturing apparatus comprising:
 the inspection apparatus as claimed in claim 1 that is configured to inspect an intermediate body of the plate-shaped object or the plate-shaped object as the inspection target.

7. The plate-shaped object manufacturing apparatus as claimed in claim 6, wherein the plate-shaped object is a gypsum building material.

8. The plate-shaped object manufacturing apparatus as claimed in claim 6, wherein the plate-shaped object is a gypsum board.

9. An inspection method for inspecting an inspection target having a band shape being conveyed linearly, the inspection method comprising:
 causing a first light source to emit a linear light beam extending along a thickness direction of the inspection target to irradiate a side surface at a first lateral end of the inspection target in a width direction orthogonal to a conveying direction of the inspection target;
 causing a second light source to emit a linear light beam extending along the thickness direction of the inspection target to irradiate a side surface at a second lateral end of the inspection target in the width direction;
 controlling a position of a first imager according to a position of the first lateral end of the inspection target such that the first imager is able to capture the light beam emitted from the light source and irradiating the side surface at the first lateral end of the inspection target;
 causing the first imager to capture the light beam emitted from the first light source and irradiating the side surface at the first lateral end of the inspection target;
 controlling a position of a second imager according to a position of the second lateral end of the inspection target such that the second imager is able to capture the light beam emitted from the light source and irradiating the side surface at the second lateral end of the inspection target;
 causing the second imager to capture the light beam emitted from the second light source and irradiating the side surface at the second lateral end of the inspection target;
 controlling locations of the first and second light sources along the conveying direction of the inspection target or along the width direction perpendicular to the conveying direction of the inspection target such that an incident angle of each light beam entering the side surface at the first and second lateral ends of the inspection target becomes a predetermined angle; and
 controlling the positions of the first imager and the second imager along the width direction respectively based on a variation of a position of the first lateral end and a position of the second lateral end of the inspection target along the width direction while conveying the inspection target along the conveying direction, the variation of the position of the first lateral end and the position of the second lateral end of the inspection target along the width direction being detected by an upper imager disposed over the first imager and the second imager,
 wherein the first light source, the second light source, the first imager and the second imager are arranged in a same plane so as to overlap a side of the inspection target.

10. The inspection method as claimed in claim 9, wherein a light emitter of the first light source and a light receiver of the first imager are located in positions higher than a lower surface of the inspection target.

11. The inspection method as claimed in claim 9, further comprising:
 an end shape calculation step of calculating a shape of the first lateral end of the inspection target based on a shape of the light beam that is emitted from the first light source to irradiate the side surface at the first lateral end of the inspection target and is captured in the imaging step; and
 an end shape determination step of evaluating the shape of the first lateral end of the inspection target calculated in the end shape calculation step.

12. The inspection method as claimed in claim 9, further comprising:
 a width calculation step of calculating a width of the inspection target based on the position of the first imager and the second imager; and
 a width determination step of evaluating the width of the inspection target calculated in the width calculation step.

13. A plate-shaped object manufacturing method for manufacturing a plate-shaped object, the plate-shaped object manufacturing method comprising:
 an inspection step of inspecting an intermediate body of the plate-shaped object or the plate-shaped object as the inspection target according to the inspection method as claimed in claim 9.

14. The plate-shaped object manufacturing method as claimed in claim 13, wherein the plate-shaped object is a gypsum building material.

15. The plate-shaped object manufacturing method as claimed in claim 13, wherein the plate-shaped object is a gypsum board.

* * * * *